United States Patent
Naghshvar et al.

(10) Patent No.: US 10,959,263 B2
(45) Date of Patent: Mar. 23, 2021

(54) LISTEN BEFORE TALK FOR MILLIMETER WAVE MULTI-USER MULTIPLE-INPUT MULTIPLE-OUTPUT COMMUNICATIONS

(71) Applicant: QUALCOMM Incorporated, San Diego, CA (US)

(72) Inventors: Mohammad Naghshvar, San Diego, CA (US); Arumugam Chendamarai Kannan, San Diego, CA (US); Ahmed Kamel Sadek, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/160,263

(22) Filed: Oct. 15, 2018

(65) Prior Publication Data
US 2019/0141744 A1 May 9, 2019

Related U.S. Application Data

(60) Provisional application No. 62/581,186, filed on Nov. 3, 2017.

(51) Int. Cl.
*H04W 74/08* (2009.01)
*H04B 7/06* (2006.01)
(Continued)

(52) U.S. Cl.
CPC ...... *H04W 74/0808* (2013.01); *H04B 7/0452* (2013.01); *H04B 7/0617* (2013.01);
(Continued)

(58) Field of Classification Search
CPC .... H04W 74/0808; H04L 5/00; H04B 7/0695; H04B 7/0617; H04B 7/0452; H04B 7/10; H04B 7/0469
See application file for complete search history.

(56) References Cited

U.S. PATENT DOCUMENTS

2014/0210635 A1* 7/2014 Majava ............... H01Q 3/34
340/870.01
2015/0289147 A1* 10/2015 Lou ................. H04B 7/0413
370/329
(Continued)

FOREIGN PATENT DOCUMENTS

| EP | 3337274 A1 | 6/2018 |
|---|---|---|
| WO | WO-2017026813 A1 | 2/2017 |
| WO | WO-2018059512 A1 | 4/2018 |

OTHER PUBLICATIONS

International Search Report and Written Opinion—PCT/US2018/056019—ISA/EPO—dated Jan. 21, 2019 (180171WO).

*Primary Examiner* — Kiet Tang
(74) *Attorney, Agent, or Firm* — Liem T. Do

(57) ABSTRACT

Methods, systems, and devices for wireless communications are described. A wireless device may include a plurality of antenna panels. The wireless device may perform a first listen before talk (LBT) procedure for a configuration of a first antenna panel based at least in part on a first LBT timer and may perform a second LBT procedure for a configuration of a second antenna panel based at least in part on a second LBT timer. The wireless device may then perform a multiple user multiple-input multiple-output (MU-MIMO) transmission. The MU-MIMO transmission may include transmitting a first packet to a second wireless device using the configuration of the first antenna and transmitting a second packet to a third wireless device using the configuration of the second antenna.

30 Claims, 12 Drawing Sheets

(51) Int. Cl.
*H04L 5/00* (2006.01)
*H04B 7/0452* (2017.01)
*H04B 7/0456* (2017.01)
*H04B 7/10* (2017.01)

(52) U.S. Cl.
CPC ............ *H04B 7/0695* (2013.01); *H04L 5/00* (2013.01); *H04B 7/0469* (2013.01); *H04B 7/10* (2013.01)

(56) References Cited

U.S. PATENT DOCUMENTS

| | | | |
|---|---|---|---|
| 2015/0304011 A1* | 10/2015 | Ponnuswamy | H04B 7/0452 370/329 |
| 2016/0057770 A1* | 2/2016 | Yerramalli | H04B 7/0811 370/329 |
| 2016/0081139 A1* | 3/2016 | Akhavan-Saraf | H04W 88/10 370/338 |
| 2016/0192395 A1 | 6/2016 | Yoo et al. | |
| 2017/0019909 A1* | 1/2017 | Si | H04L 47/27 |
| 2019/0230665 A1* | 7/2019 | Lopez-Perez | H04B 7/0617 |
| 2019/0373635 A1* | 12/2019 | Yang | H04B 7/0695 |

\* cited by examiner

LISTEN BEFORE TALK FOR MILLIMETER WAVE MULTI-USER MULTIPLE-INPUT MULTIPLE-OUTPUT COMMUNICATIONS

CROSS REFERENCES

The present Application for Patent claims the benefit of U.S. Provisional Patent Application No. 62/581,186 by Naghshvar et al., entitled "Listen Before Talk For Millimeter Wave Multi-User Multiple-Input Multiple-Output Communications," filed Nov. 3, 2017, assigned to the assignee hereof, and expressly incorporated herein.

BACKGROUND

The following relates generally to wireless communication, and more specifically to listen before talk for millimeter wave multi-user multiple-input multiple-output communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples, wireless devices may include an antenna array including a plurality of antennas. Antenna arrays may allow a wireless device to implement multiple-input multiple-output (MIMO) operation. In some examples, the antenna arrays may allow a wireless device to implement multi-user MIMO operation (MU-MIMO), in which the wireless device may communicate with two or more external devices in parallel.

SUMMARY

The described techniques relate to improved methods, systems, devices, or apparatuses that support listen before talk for millimeter wave multi-user multiple-input multiple-output communications. Generally, the described techniques provide for a first wireless device performing a first listen before talk (LBT) procedure for a first beam based at least in part on a first LBT timer, and performing a second LBT procedure for a second beam based at least in part on a second LBT timer. The first wireless device may then perform a multiple user multiple-input multiple-output (MU-MIMO) transmission based at least in part on the first LBT procedure and the second LBT procedure. The MU-MIMO transmission may include transmitting a first packet addressed to a second wireless device over the first beam and transmitting a second packet addressed to a third wireless device over the second beam.

A method of wireless communication is described. The method may include performing a first listen before talk (LBT) procedure for a first beam based at least in part on a first LBT timer, performing a second LBT procedure for a second beam based at least in part on a second LBT timer, and performing a multiple user multiple-input multiple output (MU-MIMO) transmission based at least in part on the first LBT procedure and the second LBT procedure, wherein the MU-MIMO transmission comprises transmitting a first packet addressed to a second wireless device over the first beam and a second packet addressed to a third wireless device over the second beam.

An apparatus for wireless communication is described. The apparatus may include means for performing a first listen before talk (LBT) procedure for a first beam based at least in part on a first LBT timer, means for performing a second LBT procedure for a second beam based at least in part on a second LBT timer, and means for performing a multiple user multiple-input multiple output (MU-MIMO) transmission based at least in part on the first LBT procedure and the second LBT procedure, wherein the MU-MIMO transmission comprises transmitting a first packet addressed to a second wireless device over the first beam and a second packet addressed to a third wireless device over the second beam.

Another apparatus for wireless communication is described. The apparatus may include a processor, memory in electronic communication with the processor, and instructions stored in the memory. The instructions may be operable to cause the processor to perform a first listen before talk (LBT) procedure for a first beam based at least in part on a first LBT timer, perform a second LBT procedure for a second beam based at least in part on a second LBT timer, and perform a multiple user multiple-input multiple output (MU-MIMO) transmission based at least in part on the first LBT procedure and the second LBT procedure, wherein the MU-MIMO transmission comprises transmitting a first packet addressed to a second wireless device over the first beam and a second packet addressed to a third wireless device over the second beam.

A non-transitory computer-readable medium for wireless communication is described. The non-transitory computer-readable medium may include instructions operable to cause a processor to perform a first listen before talk (LBT) procedure for a first beam based at least in part on a first LBT timer, perform a second LBT procedure for a second beam based at least in part on a second LBT timer, and perform a multiple user multiple-input multiple output (MU-MIMO) transmission based at least in part on the first LBT procedure and the second LBT procedure, wherein the MU-MIMO transmission comprises transmitting a first packet addressed to a second wireless device over the first beam and a second packet addressed to a third wireless device over the second beam.

In some examples of the method, apparatus, and non-transitory computer-readable medium described herein, the first beam corresponds to a configuration of a first antenna panel of the first wireless device, and the second beam corresponds to a configuration of a second antenna panel of the first wireless device.

Some examples of the method, apparatus, and non-transitory computer-readable medium described herein may further include processes, features, means, or instructions for performing the second LBT procedure comprises performing energy detection on a first polarization of the second beam and a second polarization of the second beam at the second antenna panel. Some examples of the method, apparatus, and non-transitory computer-readable medium described herein may further include processes, features, means, or instructions for transmitting a third packet addressed to a fourth wireless device using the second polarization of the second beam in parallel with transmitting the second packet using the first polarization of the second beam.

In some examples of the method, apparatus, and non-transitory computer-readable medium described herein, performing the second LBT procedure comprises: performing energy detection on the second beam. Some examples of the method, apparatus, and non-transitory computer-readable medium described herein may further include processes, features, means, or instructions for receiving a third packet addressed to a fourth wireless device. Some examples of the method, apparatus, and non-transitory computer-readable medium described herein may further include processes, features, means, or instructions for performing energy detection on third beam comprising the second beam and a fourth beam corresponding to a configuration of a third antenna panel. Some examples of the method, apparatus, and non-transitory computer-readable medium described herein may further include processes, features, means, or instructions for transmitting the second packet over the second beam in parallel with transmitting the third packet over the fourth beam.

In some examples of the method, apparatus, and non-transitory computer-readable medium described herein, the first timer corresponds to the first antenna panel. In some examples of the method, apparatus, and non-transitory computer-readable medium described herein, the second timer corresponds to the second antenna panel.

In some examples of the method, apparatus, and non-transitory computer-readable medium described herein, the first timer corresponds to a first group of one or more antenna panels, the first group comprising the first antenna panel. In some examples of the method, apparatus, and non-transitory computer-readable medium described herein, the second timer corresponds to a second group of one or more antenna panels, the second group comprising the second antenna panel.

In some examples of the method, apparatus, and non-transitory computer-readable medium described herein, the first timer corresponds to a first plurality of antenna panels, the first plurality of antenna panels comprising the first antenna panel. In some examples of the method, apparatus, and non-transitory computer-readable medium described herein, the second timer corresponds to a second plurality of antenna panels, the second plurality of antenna panels comprising the second antenna panel.

In some examples of the method, apparatus, and non-transitory computer-readable medium described herein, the second beam comprises a third beam corresponding to a configuration at a second antenna panel and a fourth beam corresponding to a configuration at a third antenna panel. Some examples of the method, apparatus, and non-transitory computer-readable medium described herein may further include processes, features, means, or instructions for transmitting the second packet over the second beam comprises transmitting the second packet over the third beam.

Some examples of the method, apparatus, and non-transitory computer-readable medium described herein may further include processes, features, means, or instructions for transmitting a third packet addressed to a fourth wireless device over the fourth beam in parallel with transmitting the second packet over the third beam.

In some examples of the method, apparatus, and non-transitory computer-readable medium described herein, the transmission of the first packet over the first beam overlaps with the transmission of the second packet over the second beam.

Some examples of the method, apparatus, and non-transitory computer-readable medium described herein may further include processes, features, means, or instructions for performing the first LBT procedure in parallel with performing the second LBT procedure.

Some examples of the method, apparatus, and non-transitory computer-readable medium described herein may further include processes, features, means, or instructions for performing the second LBT procedure after performing the first LBT procedure.

Some examples of the method, apparatus, and non-transitory computer-readable medium described herein may further include processes, features, means, or instructions for performing a third LBT procedure for a third beam based at least in part on a third LBT timer.

In some examples of the method, apparatus, and non-transitory computer-readable medium described herein, the MU-MIMO transmission further comprises transmitting a third packet addressed to a fourth wireless device over the third beam.

A method of wireless communication is described. The method may include performing a first listen before talk (LBT) procedure for a first beam based at least in part on a first LBT timer, the first beam comprising a second beam and a third beam and performing a multiple user multiple-input multiple output (MU-MIMO) transmission based at least in part on the first LBT procedure, wherein the MU-MIMO transmission comprises transmitting a first packet addressed to a second wireless device over the second beam and a second packet addressed to a third wireless device over the third beam.

An apparatus for wireless communication is described. The apparatus may include means for performing a first listen before talk (LBT) procedure for a first beam based at least in part on a first LBT timer, the first beam comprising a second beam and a third beam and means for performing a multiple user multiple-input multiple output (MU-MIMO) transmission based at least in part on the first LBT procedure, wherein the MU-MIMO transmission comprises transmitting a first packet addressed to a second wireless device over the second beam and a second packet addressed to a third wireless device over the third beam.

Another apparatus for wireless communication is described. The apparatus may include a processor, memory in electronic communication with the processor, and instructions stored in the memory. The instructions may be operable to cause the processor to perform a first listen before talk (LBT) procedure for a first beam based at least in part on a first LBT timer, the first beam comprising a second beam and a third beam and perform a multiple user multiple-input multiple output (MU-MIMO) transmission based at least in part on the first LBT procedure, wherein the MU-MIMO transmission comprises transmitting a first packet addressed to a second wireless device over the second beam and a second packet addressed to a third wireless device over the third beam.

A non-transitory computer-readable medium for wireless communication is described. The non-transitory computer-readable medium may include instructions operable to cause a processor to perform a first listen before talk (LBT) procedure for a first beam based at least in part on a first LBT timer, the first beam comprising a second beam and a third beam and perform a multiple user multiple-input multiple output (MU-MIMO) transmission based at least in part on the first LBT procedure, wherein the MU-MIMO transmission comprises transmitting a first packet addressed to a second wireless device over the second beam and a second packet addressed to a third wireless device over the third beam.

In some examples of the method, apparatus, and non-transitory computer-readable medium described herein, the second beam comprises a first polarization of a configuration at a first antenna panel. In some examples of the method, apparatus, and non-transitory computer-readable medium described herein, the third beam comprises a second polarization of the configuration.

In some examples of the method, apparatus, and non-transitory computer-readable medium described herein, the second beam comprises a first configuration at a first antenna panel. In some examples of the method, apparatus, and non-transitory computer-readable medium described herein, the third beam comprises a second configuration at a second antenna panel.

Some examples of the method, apparatus, and non-transitory computer-readable medium described herein may further include processes, features, means, or instructions for performing a second LBT procedure for the second beam based at least in part on the first LBT timer prior to performing the first LBT procedure. Some examples of the method, apparatus, and non-transitory computer-readable medium described herein may further include processes, features, means, or instructions for determining to transmit the second packet over the third beam. Some examples of the method, apparatus, and non-transitory computer-readable medium described herein may further include processes, features, means, or instructions for abandoning the second LBT procedure based at least in part on the determining.

In some examples of the method, apparatus, and non-transitory computer-readable medium described herein, the first wireless device comprises a plurality of LBT timers, wherein each of the LBT timers corresponds to an antenna panel of the first wireless device.

In some examples of the method, apparatus, and non-transitory computer-readable medium described herein, the first wireless device comprises a plurality of LBT timers, wherein each of the LBT timers corresponds to one or more antenna panels of the first wireless device.

In some examples of the method, apparatus, and non-transitory computer-readable medium described herein, the first wireless device comprises a plurality of LBT timers, wherein each of the LBT timers corresponds to a plurality of antenna panels of the first wireless device.

In some examples of the method, apparatus, and non-transitory computer-readable medium described herein, the transmission of the first packet over the second beam overlaps with the transmission of the second packet over the third beam.

DETAILED DESCRIPTION

Figure 1:
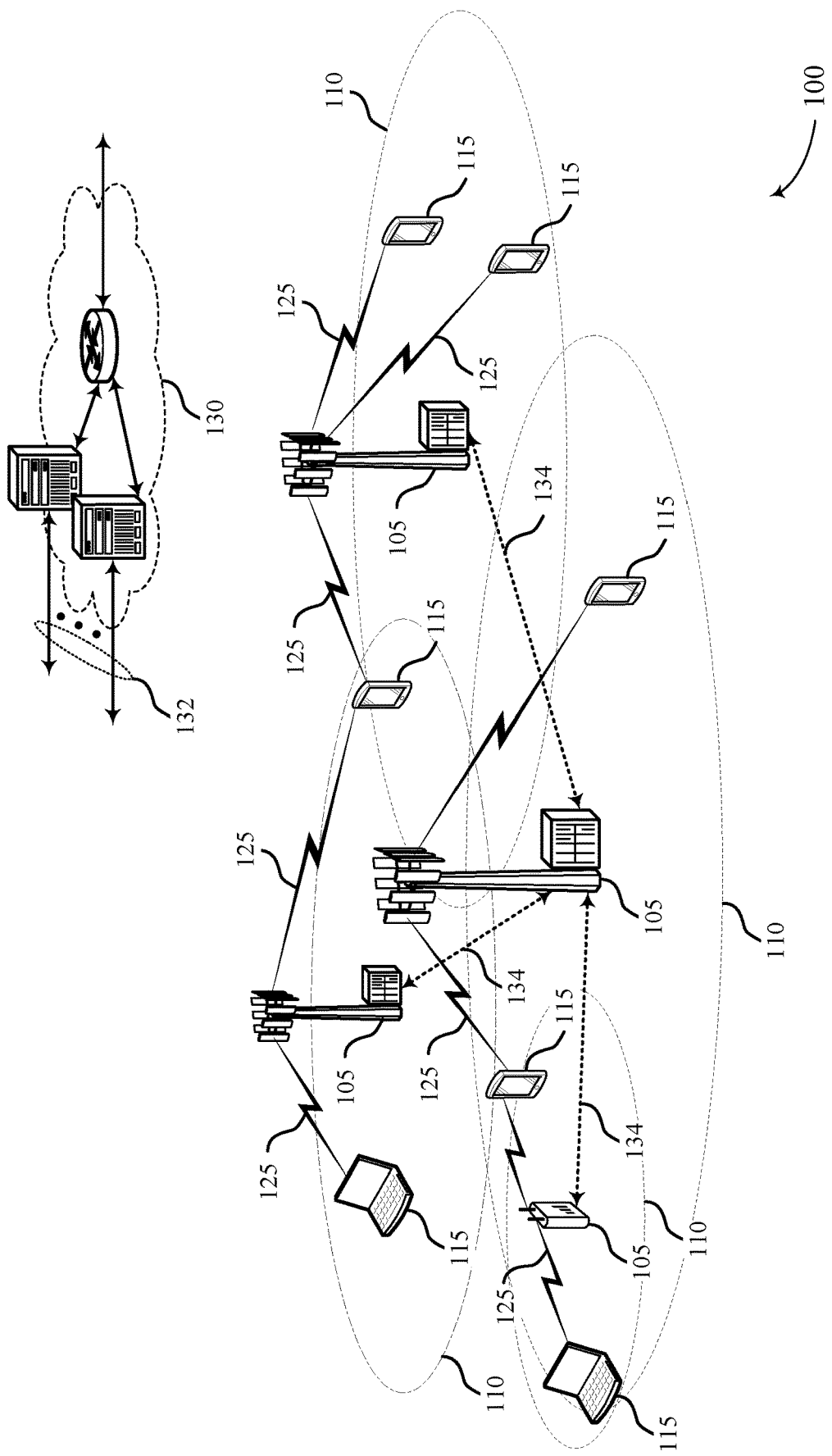
FIG. 1 illustrates an example of a system for wireless communication that supports listen before talk for millimeter wave multi-user multiple-input multiple-output communications in accordance with aspects of the present disclosure.

Multi-user multiple-input multiple-output (MU-MIMO) antennas may provide functionality to allow a wireless device to communicate with two or more destination nodes in parallel. However, such parallel communication poses a danger that the two or more independent communication streams may interfere with each other. In some examples, a MU-MIMO wireless device may include a scheduler to avoid self-interference by selecting only streams that do not cause such interference for parallel communication.

In some examples, a wireless device may include two or more listen before talk (LBT) state machines, with each of the state machines corresponding to one or more antenna panels with one or more possible configurations. In some examples, each state machine may include or may be associated with a LBT timer, such that each timer likewise corresponds to one or more antenna panels. In some examples, a wireless device may include two or more timers. A wireless device may perform two or more LBT procedures sequentially or in parallel based at least in part on the two or more LBT timers, before scheduling on one or more beams.

In some examples, a first LBT procedure may be performed on a first beam associated with a first antenna panel based at least in part on a first LBT timer, and a second LBT procedure may be performed on a second beam associated with a second antenna panel different than the first antenna panel based at least in part on a second LBT timer. Communications may be scheduled on both the first beam and the second beam in parallel if there is no interference prior to the scheduling.

In some examples, a first LBT procedure may be performed on a first beam associated with a first antenna panel. Upon successful completion of the first LBT procedure, the wireless device may transmit on the first polarization of the first beam and the second polarization of the first beam in parallel.

In some examples, a first LBT procedure may be performed on a wide beam including a first narrow beam and a second narrow beam. The wide beam may include the first narrow beam and the second narrow beam in that the bandwidth of the wide beam may be wider than the beamwidth of the first narrow beam and the second narrow beam and the wide beam includes the center angles of the first narrow beam and the second narrow beam. In some examples, the wide beam may have lower gain than the first narrow beam and the second narrow beam. The first narrow beam may be associated with a first antenna panel, and the second narrow beam may be associated with a second antenna panel different than the first antenna beam. Upon successful completion of the first LBT procedure, the wireless device may transmit on the first narrow beam and the second narrow beam in parallel.

Aspects of the disclosure are initially described in the context of a wireless communications system. Aspects of the disclosure are further illustrated by and described with reference to apparatus diagrams, system diagrams, and flowcharts that relate to listen before talk for millimeter wave multi-user multiple-input multiple-output communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$,32 1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 and/or UEs 115 may include a MU-MIMO communications manager 101, which may be configured to perform two or more LBT procedures for different beams based at least in part on different LBT timers. For example, the MU-MIMO communications manager may perform a first LBT procedure for a first beam based at least in part on a first LBT timer and a second LBT procedure for a second beam based at least in part on a second LBT timer.

The first beam may be a configuration of a first antenna panel and the second configuration may be a configuration for a second antenna panel. In some examples, the first timer corresponds to the first antenna panel and the second timer corresponds to the second panel. In some examples, the first timer corresponds to a first group of one or more antenna panels including the first antenna panel and the second timer corresponds to a second group of one or more antenna panels including the second antenna panel. In some examples, the first timer corresponds to a first plurality of antenna panels including the first antenna panel, and the second timer corresponds to the second plurality of antenna panels including the second antenna panel.

In some other examples, the first beam and the second beam may be different polarizations of a single antenna panel.

In some examples, the first LBT procedure may be performed in parallel with the second LBT procedure. In some other examples, the first LBT procedure may be performed before the second LBT procedure. The MU-MIMO communications manager may also be configured to perform a plurality of additional LBT procedures based on a plurality of different LBT timers in parallel or in series with the first and second LBT procedures.

The MU-MIMO communications manager may further be configured to perform a MU-MIMO transmission including transmitting the first packet on the first beam and transmitting the second packet on the second beam.

Figure 2:
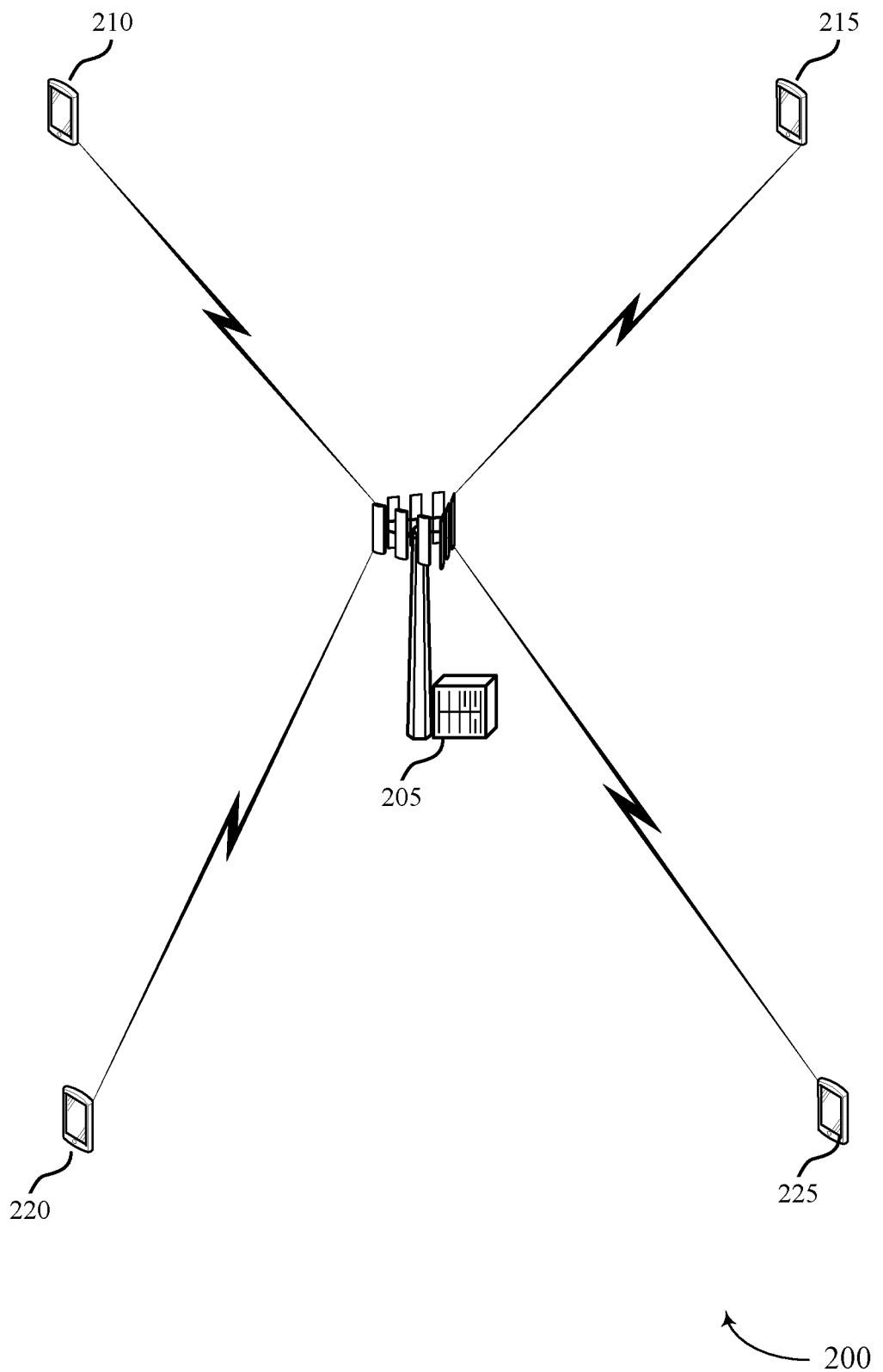
FIG. 2 illustrates an example of a wireless communication system that supports listen before talk for millimeter wave multi-user multiple-input multiple-output communications in accordance with aspects of the present disclosure.

FIG. 2 illustrates an example of a wireless communications system 200 that supports listen before talk for millimeter wave multi-user multiple-input multiple-output communications in accordance with various aspects of the present disclosure. In some examples, wireless communications system 200 may implement aspects of wireless communications system 100.

The wireless communications system 200 may include a first wireless device 205, a second wireless device 210, a third wireless device 215, a fourth wireless device 220, and a fifth wireless device 225. Wireless devices 205 through 225 may be examples of aspects of base station 105 or UE 115, as described with reference to FIG. 1. In some examples, the first wireless device 205 may be a base station and the second wireless device 210, the third wireless device 215, the fourth wireless device 220, and the fifth wireless device 225 may be UEs.

The first wireless device 205 may include a multi-user multiple-input multiple-output (MU-MIMO) antenna array. The antenna array may include a plurality of antenna panels, with each antenna panel including a plurality of antennas. Each antenna panel may be capable of implementing one or more antenna configurations. Each antenna configuration may be referred to as a beam. Each antenna panel may be single polarized or dual polarized. In some examples, the antenna array may include $M_g \times N_g$ antenna panels, where $M_g$ is the number of panels in each column and $N_g$ is the number of panels in each row of the antenna array.

The first wireless device 205 may perform a beam pairing procedure to select a beam for use in communicating with another wireless device (e.g., the second wireless device 210). In some examples, the first wireless device 205 may search for a best transmission and/or reception beam across all antenna panels in the antenna array. The same or a different beamforming codebook may be used for each of the panels. Beam sweeping for the antenna array using such a procedure may take $M_g \times N_g \times P^2$ times longer than beam sweeping for a single panel single polarized antenna, where P is 1 for a single polarized antenna panel and 2 for a dual polarized antenna panel. The first wireless device 205 may receive a report from the second wireless device 210 identifying the best beam, and may associate the second wireless device 210 with the antenna panel corresponding to the best beam. Subsequent data scheduling for the second wireless device 210 may be done using the selected antenna panel. The number of spatial streams to the second wireless device 210 may be limited to P.

In some other examples, the first wireless device 205 may search for a best transmission and/or reception beam across a single antenna panel. The same beamforming codebook may be used for each antenna panel. Beam sweeping for the antenna array using such a procedure may take P times longer than beam sweeping for a single panel single polarized antenna. The first wireless device 205 may receive a report from the second wireless device 210 identifying the best beam. Subsequent data scheduling for the second wireless device 210 may be done using the selected beam on any available antenna panel. The number of spatial streams to the second wireless device 210 may be limited to P.

Scheduling of transmissions may be performed in a sequential manner. For example, each of the wireless devices 210 through 225 may be associated with a priority level (e.g., according to a proportional fair rule with consideration of queue size). Transmissions to the highest priority wireless device (e.g., second wireless device 210)

may be scheduled first. For scheduling of subsequent wireless devices, a scheme to reduce self-interference may be applied.

In some examples, an angular-based mode of self-interference avoidance may be applied. This mode may schedule subsequent wireless devices based at least in part on a center angle of a beam. For example, communications to a second priority wireless device (e.g., third wireless device 215) may be scheduled only if the beam for transmissions to the third wireless device 215 has a beam center angle that is sufficiently far away from the beam center angle of the second wireless device 210. Subsequent wireless devices (e.g., fourth wireless device 220) may be scheduled only if their beam center angles are sufficiently far away from all previously-scheduled wireless devices (e.g., second wireless device 210 and third wireless device 215).

In some other examples, a signal-to-noise ratio-based mode of self-interference avoidance may be applied. For example, communications to a second priority wireless device (e.g., a third wireless device 215) may be scheduled based at least in part on a signal-to-interference-plus-noise ratio (SINR). In such a mode, simultaneous scheduling of wireless devices that cause significant SINR impact to each other may be avoided to control self-interference at the base station. For example, communications to third wireless device 215 may be scheduled only if such communications will not cause significant SINR impact to communications to the second wireless device 210. SINR-based modes of self-interference avoidance may show superior performance, but may have higher complexity.

In some other examples, a capacity-based mode of self-interference avoidance may be applied. In such a mode, the first wireless device 205 may add a new wireless device to the list for simultaneous transmission only if the total capacity of the first wireless device 205 increases by at least a threshold amount (e.g., a certain percentage).

Scheduling of subsequent transmissions may also be performed according to a multi-beam listen before talk (LBT) scheme. In such a scheme, a channel access procedure (e.g., a LBT procedure) is performed on two or more beams, either sequentially or in parallel, before scheduling on one or more beams.

The first wireless device 205 may have two or more LBT state machines and/or LBT timers associated with the MU-MIMO antenna array. In some examples, each LBT state machine and/or LBT timer may be associated with one of the antenna panels in the antenna array, such that the first wireless device 205 includes $M_g \times N_g$ LBT state machines and/or LBT timers. In some other examples, each LBT state machine and/or LBT timer may be associated with one or more of the antenna panels in the antenna array, such that the first wireless device 205 includes K state machines and/or LBT timers, where $K \leq M_g \times N_g$. In some other examples, each LBT state machine and/or LBT timer may be associated with a plurality of the antenna panels in the antenna array. Each antenna panel in the antenna array may be associated with only one of the LBT state machines and/or LBT timers. The first wireless device 205 may perform a LBT procedure on more than one beam before scheduling on one or more beams. The LBT procedures may be performed sequentially or in parallel.

In some examples, the first wireless device 205 may have $M_g \times N_g$ state machines and/or LBT timers. A first packet may become available for transmission (e.g., the first packet may be received from a higher layer be the only packet available for transmission, or the first packet may be selected as the winner of a scheduler metric). The first packet may be addressed to the second wireless device 210. The first wireless device 205 may determine that the first packet is to be transmitted using a first configuration of a first antenna panel. The first configuration of the first antenna panel may be denoted as the first beam. The first wireless device 205 may initiate a first LBT procedure based at least in part on the state machine and/or LBT timer corresponding to the first antenna panel. The first LBT procedure may include performing energy detection on the first beam.

After the first LBT procedure is initiated, and before the first LBT procedure concludes, a second packet may become available for transmission. The second packet may be addressed to a third wireless device 215. The first wireless device 205 may determine that the second packet is to be transmitted using a second configuration of a second antenna panel. The second configuration of the second antenna panel may be denoted as the second beam. The first wireless device 205 may initiate a second LBT procedure based at least in part on the state machine and/or LBT timer corresponding to the second antenna panel. The second LBT procedure may include performing energy detection on the second beam.

Upon successful completion of the first LBT procedure, the first wireless device 205 may transmit a first reservation request (RRQ) on the first beam. In response, the second wireless device 210 may transmit a first reservation response (RRS) to the first wireless device 205 on the first beam. The first wireless device 205 may then transmit the first packet on the first beam (e.g., in one or more first data frames) to the second wireless device 210. The first wireless device 205 may also transmit a first preamble frame and one or more first control frames to the second wireless device 210 on the first beam. The second wireless device 210 may transmit a first acknowledgement (ACK) such as a block ACK to the first wireless device 205 on the first beam.

Upon successful completion of the second LBT procedure, the first wireless device 205 may transmit a second RRQ to the third wireless device 215 on the second beam. In response, the third wireless device 215 may transmit a second RRS to the first wireless device 205 on the second beam. The first wireless device 205 may then transmit the second packet on the second beam (e.g., in one or more second data frames) to the third wireless device 215. The first wireless device 205 may also transmit a second preamble frame and one or more second control frames to the third wireless device 215 on the second beam. The third wireless device 215 may transmit a second ACK such as a block ACK to the first wireless device 205 on the second beam.

In some examples, transmission of the first data packet over the first beam may overlap with transmission of the second data packet over the second beam. In some examples, the first wireless device 205 may also perform a third LBT procedure for a third beam for communications to a fourth wireless device 220 sequentially or in parallel with performing the first and second LBT procedures.

In some examples, the first wireless device 205 may have $M_g \times N_g$ state machines and/or timers. A first packet may become available for transmission (e.g., the first packet may be received from a higher layer be the only packet available for transmission, or the first packet may be selected as the winner of a scheduler metric). The first packet may be addressed to the second wireless device 210. The first wireless device 205 may determine that the first packet is to be transmitted using a first configuration of a first antenna panel. The first configuration of the first antenna panel may be denoted the first beam. In some examples, the first antenna panel may be a dual polarized antenna panel, and the first wireless device 205 may determine that the first packet is to be transmitted using a first polarization of the first analog beam. The first wireless device 205 may initiate a first LBT procedure based at least in part on the state machine and/or timer corresponding to the first antenna panel. The first LBT procedure may include performing energy detection on the first beam.

After the first LBT procedure is initiated, and before the first LBT procedure concludes, a second packet may become available for transmission. The second packet may be addressed to third wireless device 215. The first wireless device 205 may determine that the second packet is to be transmitted using a second polarization of the first beam. In some examples, because the first LBT procedure includes performing energy detection with respect to all polarizations of the first beam, the first wireless device 205 may rely on the first LBT procedure for transmission of the second packet.

Upon successful completion of the first LBT procedure, the first wireless device 205 may transmit a first RRQ using the first polarization of the first beam and a second RRQ using a second polarization of the first beam. In some examples, the first wireless device 205 may transmit the first RRQ in parallel with the transmission of the second RRQ. In response to the first RRQ, the second wireless device 210 may transmit a first RRS to the first wireless device 205 on the first beam. The first wireless device 205 may then transmit the first packet using the first polarization of the first beam (e.g., in one or more first data frames) to the second wireless device 210. The first wireless device 205 may also transmit a first preamble frame and one or more first control frames to the second wireless device 210 on the first polarization of the first beam. The second wireless device 210 may transmit a first ACK such as a block ACK to the first wireless device 205 using the first polarization of the first beam.

In response to the second RRQ, the third wireless device 215 may transmit a second RRS to the first wireless device 205 on the second polarization of the first beam. The first wireless device 205 may then transmit the second packet on the second polarization of the first beam (e.g., in one or more second data frames) to the third wireless device 215. The first wireless device 205 may also transmit a second preamble frame and one or more second control frames to the third wireless device 215 on the second polarization of the first beam. The third wireless device 215 may transmit a second ACK such as a block ACK to the first wireless device 205 on the second polarization of the first beam.

In some examples, transmission of the first data packet over the first polarization of the first beam may occur in parallel with transmission of the second data packet over the second polarization of the first beam. In some examples, the first wireless device 205 may also perform a second LBT procedure for a second beam for communications to a fourth wireless device 220 sequentially or in parallel with performing the first LBT procedures.

In some examples, the first wireless device 205 may have $K \leq M_g \times N_g$ state machines and/or timers. For example, a first state machine and/or timer may be associated with a group of antenna panels including a first antenna panel and a second antenna panel. A first packet may become available for transmission (e.g., the first packet may be received from a higher layer and may be the only packet available for transmission, or the first packet may be selected as the winner of a scheduler metric). The first packet may be addressed to the second wireless device 210. The first wireless device 205 may determine that the first packet is to be transmitted using a first configuration of the first antenna panel. The first configuration of the first antenna panel may be denoted as the first beam. The first wireless device 205 may initiate a first LBT procedure based at least in part on the first state machine and/or timer. The first LBT procedure may include performing energy detection on the first beam.

After the first LBT procedure is initiated, and before the first LBT procedure concludes, a second packet may become available for transmission. The second packet may be addressed to a third wireless device 215. The first wireless device 205 may determine that the second packet is to be transmitted using a second configuration of the second antenna panel. The second configuration of the second antenna panel may be denoted as the second beam. The first wireless device 205 may be unable to initiate a LBT procedure specific to the second beam because the first state machine and/or timer is already in use. Instead, the first wireless device 205 may initiate a second LBT procedure based at least in part on the first state machine and/or timer for a wide beam including the first beam and the second beam. In some examples, the first wireless device 205 may abandon the first LBT procedure upon starting the second LBT procedure. The second LBT procedure may include performing energy detection on the wide beam.

Upon successful completion of the second LBT procedure, the first wireless device 205 may transmit a first RRQ over the first beam and a second RRQ over the second beam. In some examples, the first wireless device 205 may transmit the first RRQ in parallel with the transmission of the second RRQ. In response to the first RRQ, the second wireless device 210 may transmit a first RRS to the first wireless device 205 over the first beam. The first wireless device 205 may then transmit the first packet over the first beam (e.g., in one or more first data frames) to the second wireless device 210. The first wireless device 205 may also transmit a first preamble frame and one or more first control frames to the second wireless device 210 over the first beam. The second wireless device 210 may transmit a first ACK such as a block ACK to the first wireless device 205 over the first beam.

In response to the second RRQ, the third wireless device 215 may transmit a second RRS to the first wireless device 205 over the second beam. The first wireless device 205 may then transmit the second packet over the second beam (e.g., in one or more second data frames) to the third wireless device 215. The first wireless device 205 may also transmit a second preamble frame and one or more second control frames to the third wireless device 215 over the second beam. The third wireless device 215 may transmit a second ACK such as a block ACK to the first wireless device 205 over the second beam.

In some examples, transmission of the first data packet over the first configuration of the first antenna panel denoted as the first beam may occur in parallel with transmission of the second data packet over the second configuration of the second antenna panel denoted as second beam. In some examples, the first wireless device 205 may also perform a second LBT procedure for a second beam for communications to a fourth wireless device 220 sequentially or in parallel with performing the first LBT procedures.

In some examples, transmission of the first data packet over the first beam may overlap with transmission of the second data packet over the second beam. In some examples, before the second LBT is concluded, the first wireless device 205 may receive a third packet addressed to the fourth wireless device 220. The first wireless device 205 may determine that the third packet is to be transmitted using a third beam of a third antenna panel. In some examples, the third antenna panel may be associated with a second state machine and/or timer, and the first wireless device 205 may initiate a third LBT procedure in parallel with the second LBT procedure.

In some other examples, the third antenna panel may be a member of the group of antenna panels associated with the first state machine and/or timer. In the case where the third beam is within the wide beam, the first wireless device 205 may rely on the second LBT procedure for transmission of the third packet. In the case where the third beam is not within the wide beam, the first wireless device 205 may abandon the second LBT procedure and initiate a third LBT procedure based at least in part on the first state machine and/or timer for a second wide beam including the first beam, the second beam, and the third beam.

Figure 3:
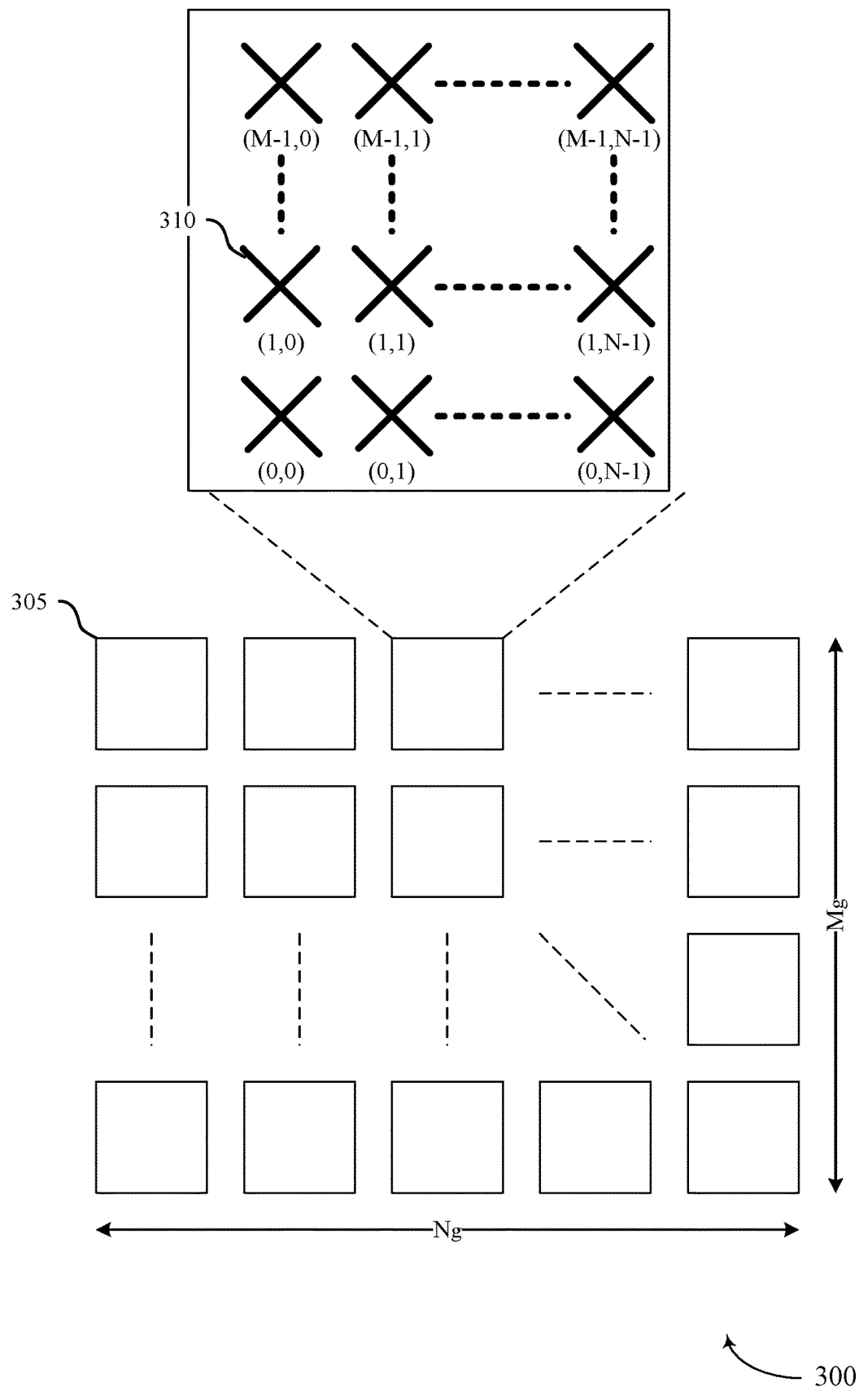
FIG. 3 illustrates an example of an antenna array in a wireless communication system that supports listen before talk for millimeter wave multi-user multiple-input multiple-output communications in accordance with aspects of the present disclosure.

FIG. 3 illustrates an example of an antenna array 300 that supports listen before talk for millimeter wave multi-user multiple-input multiple-output communications in accordance with various aspects of the present disclosure. In some examples, antenna array 300 may implement aspects of wireless communications system 100. For example, the antenna array 300 may be part of a base station such as base station 105 as described with reference to FIG. 1. In some examples, the antenna array 300 may be a component of a first wireless device 205 as described with reference to FIG. 2.

The antenna array 300 may include a number of antenna panels 305. For example, the antenna array 300 may include $M_g \times N_g$ panels, where $M_g$ is the number of panels in each column and $N_g$ is the number of panels in each row. Each panel may be single polarized (P=1) or dual polarized (P=2). The total number of receive chains for the antenna array 300 may be denoted as $M_g \times N_g \times P$.

Each antenna panel 305 may include a number of antennas 310. For example, an antenna panel 305 may include M×N antennas, where M is the number of antennas in each column and N is the number of panels in each row.

A wireless device (e.g., first wireless device 205) may perform a beam pairing procedure to identify an antenna panel 305 for transmissions to a target wireless device (e.g., a second wireless device 210) in a wireless communication system (e.g., wireless communications system 200). In some examples, one of the antenna panels 305 may be associated with the target wireless device, and the selected antenna panel 305 may be used for transmissions to the target wireless device. In some other examples, a configuration of the antennas 310 on an antenna panel 305 may be associated with the target wireless device, and the selected configuration may be used on any available antenna panel 305 for transmission to the target wireless device.

Figure 4:
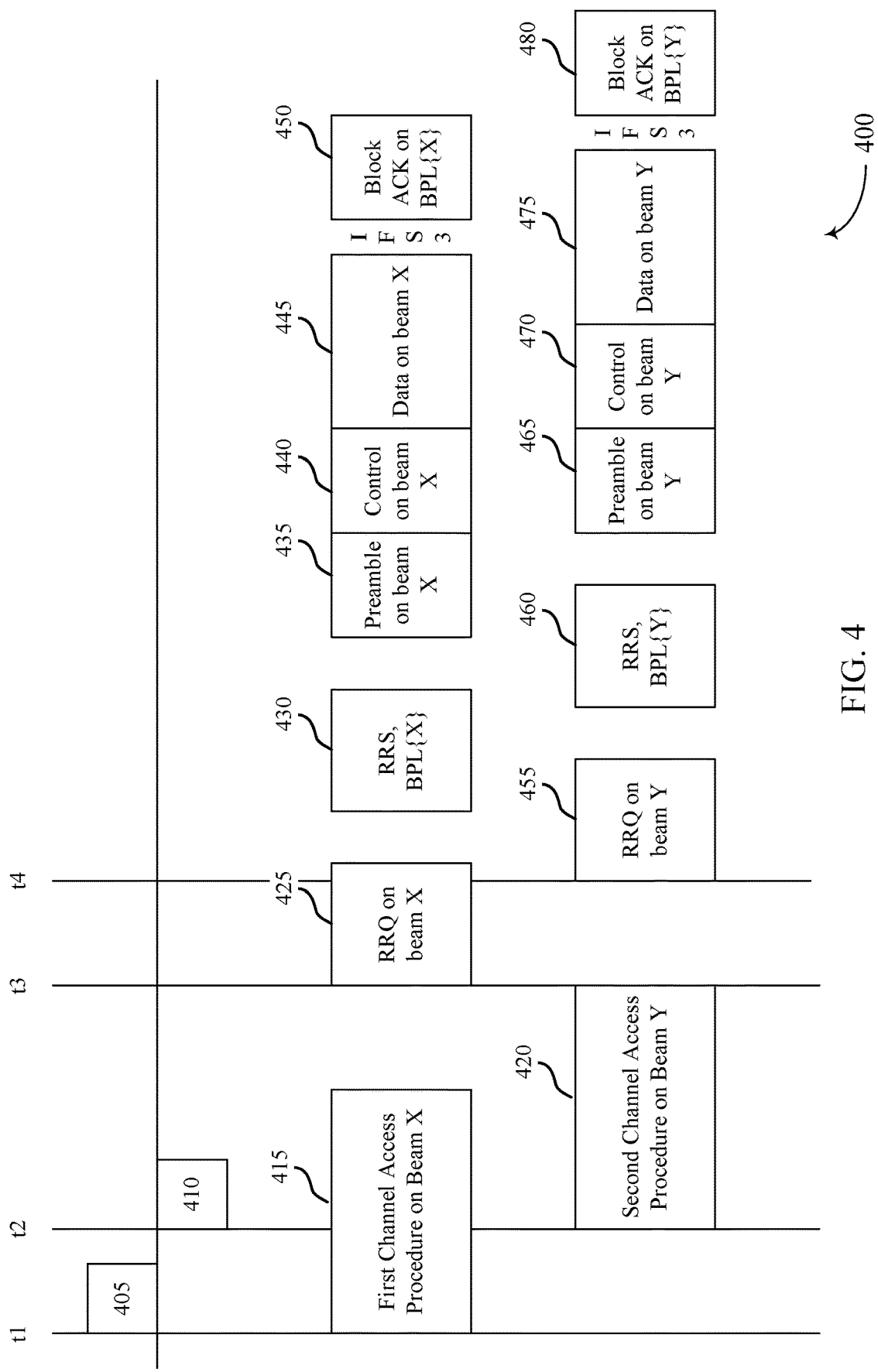
FIG. 4 illustrates an example of a timing diagram for a wireless communication system that supports listen before talk for millimeter wave multi-user multiple-input multiple-output communications in accordance with aspects of the present disclosure.

FIG. 4 illustrates an example of a timing diagram 400 in a wireless communications system that supports listen before talk for millimeter wave multi-user multiple-input multiple-output communications in accordance with various aspects of the present disclosure. In some examples, the wireless communications system may implement aspects of wireless communications system 100.

The timing diagram 400 shows communications involved in the transmission of a first packet 405 and a second packet 410 over different beams at a wireless device such as first wireless device 205 as described with reference to FIG. 2. The wireless device may include a MU-MIMO antenna array such as antenna array 300 described with reference to FIG. 3. In some examples, the base station may have one state machine and/or timer per panel (i.e., there may be a 1:1 relationship between a state machine/timer and a panel). Each panel may run its state machine and/or timer for only one beam at a time, and a dual polarized panel may not run the state machine and/or timer for both polarizations at the same time.

The wireless device may transmit the first packet 405 to a second wireless device (e.g., second wireless device 210) using a first beam configuration denoted beam X, and may transmit the second packet 410 to a third wireless device (e.g., third wireless device 215) using a second beam configuration denoted beam Y. For example, the first packet 405 may be addressed to the second wireless device, and the second packet 410 may be addressed to the third wireless device. In some examples, the wireless device may be a base station (e.g., base station 105 described with reference to FIG. 1) and the second and third wireless devices may be UEs (e.g., UEs 115 described with reference to FIG. 1).

The first packet 405 may become available for transmission at the wireless device at time t1 (e.g., because it arrives from a higher layer or is selected as the winner of a scheduler metric). The wireless device may select beam X for transmission of the first packet 405 and may begin performing a first channel access procedure 415 for beam X based at least in part on a first state machine and/or timer at time t1. The first state machine and/or timer may be associated with a first antenna panel. The first channel access procedure 415 may be an energy detection listen before talk (LBT) procedure, a preamble based LBT procedure, or another LBT procedure. For example, the wireless device may select thresholds for energy detection and/or preamble detection to use during the first channel access procedure 415. In some examples, the first channel access procedure 415 may include energy detection over N contention slots (countdown from N to 0). In some examples, the first channel access procedure 415 may include monitoring for a reservation request message (RRQ) or a reservation response message (RRS) over M slots.

The first channel access procedure 415 may be considered successful if the channel is determined available for communicating the downlink data and unsuccessful if the base station detects an energy level/preamble above the threshold and/or other RRQ/RRS exchanges on the channel during the first channel access procedure 415. In some examples, the first channel access procedure 415 may be considered successful when there are no active RRQ or RRS exchanges detected during the first channel access procedure 415.

In some examples, the first channel access procedure 415 may be operator-based. For example, the base station may determine that an active RRQ or RRS is received from other devices during the first channel access procedure 415 and perform a backoff procedure based on the active RRQ or RRS for the operator of the base station (e.g., the first operator) and/or for a different operator (second operator).

The second packet 410 may become available for transmission at the wireless device at time t2. The wireless device may select beam Y for transmission of the second packet 410 and may begin performing a second channel access procedure 420 for beam Y based at least in part on a second state machine and/or timer at time t2. The second state machine and/or timer may be associated with a second panel different that the first panel. The second channel access procedure 420 may include the features described herein with respect to the first channel access procedure 415. In some examples, the wireless device may perform the second channel access procedure 420 while performing the first channel access procedure 415. For example, the second channel access procedure 420 may overlap with the first channel access procedure or may be performed simultaneously with the first channel access procedure 415. In some other examples, the second channel access procedure 420 may not overlap with the first channel access procedure 415.

When the first channel access procedure 415 is successful, the base station may transmit a first RRQ 425 to the second wireless device at time t3. The first RRQ 425 may include a reservation request for beam X. The first RRQ 425 may be transmitted using beam X. The second wireless device may respond by transmitting a first RRS 430 to the wireless device.

The wireless device may communicate with the second wireless device using beam X in response to the first RRS 430. The wireless device may transmit first preamble 435, first control 440, and first data 445 to the second wireless device using beam X. The first data 445 may include the first packet 405 or a portion thereof. In some examples, first control 440 and first data 445 may be repeated N times for the N slots in the first transmission opportunity (TxOP). The second wireless device may transmit a first block ACK 450 to the wireless device to acknowledge receipt of the communication.

When the second channel access procedure 420 is successful, the wireless device may transmit a second RRQ 455 to the third wireless device at time t4. The second RRQ 455 may include a reservation request for beam Y. The second RRQ 455 may be transmitted using beam Y. The third wireless device may respond by transmitting a second RRS 460 to the wireless device.

The wireless device may communicate with the third wireless device using beam Y in response to the second RRS 460. The wireless device may transmit second preamble 465, second control 470, and second data 475 to the third wireless device using beam Y. The second data 475 may include the second packet 410 or a portion thereof. In some examples, second control 470 and second data 475 may be repeated N times for the N slots in the second TxOP. The third wireless device may transmit a first block ACK 480 to the wireless device to acknowledge receipt of the communication.

In some examples, the transmission of communications including the first preamble 435 through the first data 445 using beam X may overlap with the transmission of communications including the second preamble 465 through the second data 475 using beam Y, e.g., the base station may transmit using both beam X and beam Y simultaneously.

In some examples, the second antenna panel may be a dual polarized antenna panel. Analog beam Y may include a first polarization denoted beam A and a second polarization denoted beam B, and the second packet may be transmitted using beam A. A third packet may arrive at the wireless device after time t2 (i.e., after the second channel access procedure 420 has begun), and the wireless device may determine that the third packet is to be transmitted using beam B. In some examples, because the second state machine and/or timer can be run for only one beam at a time, a third channel access procedure for beam B will not be run until after the second channel access procedure 420 and/or related communications have been completed. In some other examples, the wireless device may rely on the second channel access procedure to transmit the third packet on beam B.

Figure 5:
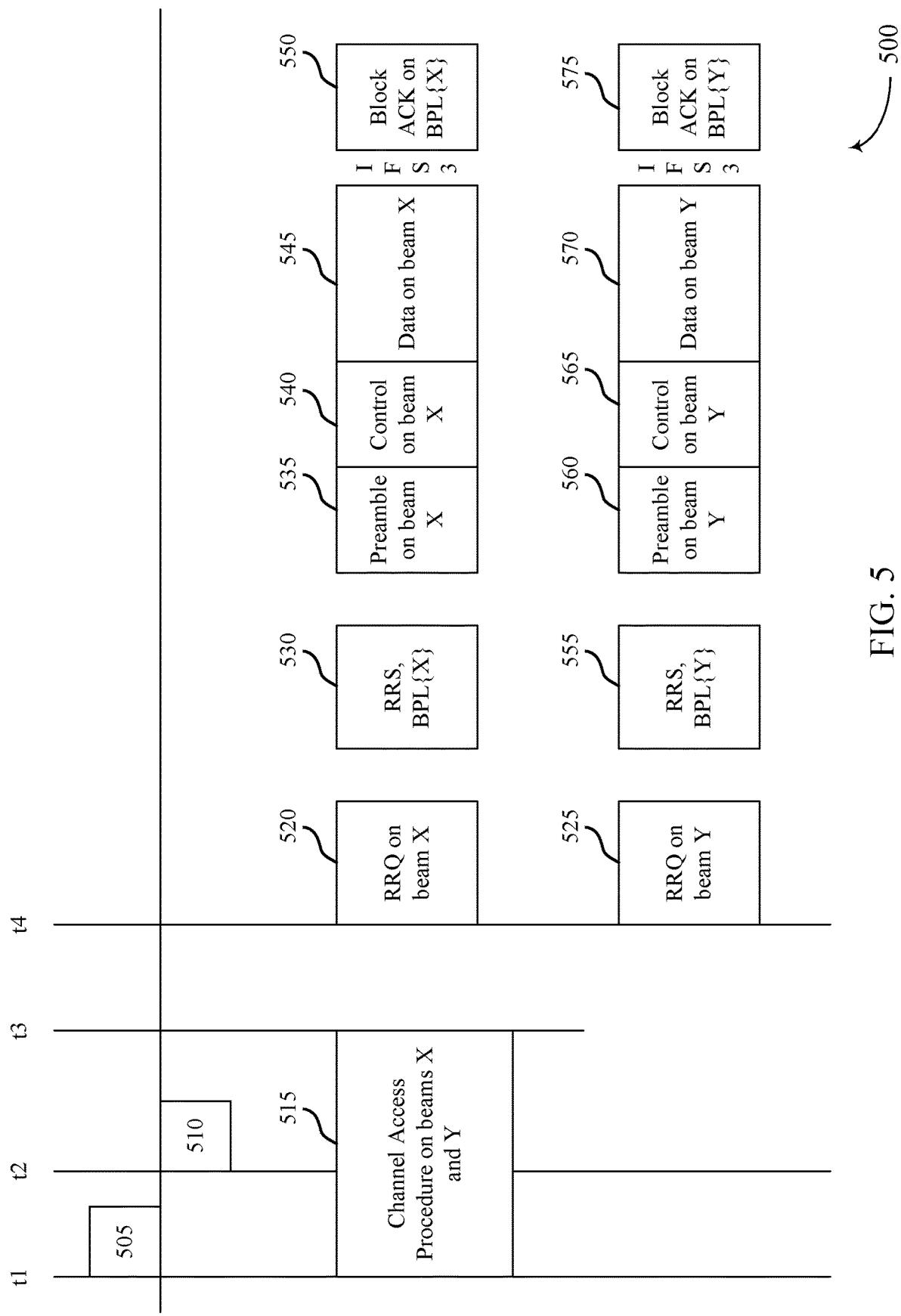
FIG. 5 illustrates an example of a timing diagram for a wireless communication system that supports listen before talk for millimeter wave multi-user multiple-input multiple-output communications in accordance with aspects of the present disclosure.

FIG. 5 illustrates an example of a timing diagram 500 in a wireless communications system that supports listen before talk for millimeter wave multi-user multiple-input multiple-output communications in accordance with various aspects of the present disclosure. In some examples, the wireless communications system may implement aspects of wireless communications system 100.

The timing diagram 500 shows communications involved in the transmission of a first packet 505 and a second packet 510 using different beams at a wireless device such as first wireless device 205 as described with reference to FIG. 2. The wireless device may include a MU-MIMO antenna array such as antenna array 300 described with reference to FIG. 3. In some examples, the wireless device may have one state machine and/or timer per panel (i.e., there may be a 1:1 relationship between a state machine/timer and a panel). Each panel may run its state machine and/or timer for only one beam at a time. Dual polarized panels may run their state machines and/or timers for both polarizations at all times, i.e., the channel access procedure may be performed with respect to an analog beam Z having first polarization beam X and second polarization beam Y.

The wireless device may transmit the first packet 505 to a second wireless device (e.g., second wireless device 210 described with reference to FIG. 2) using a first beam configuration denoted beam X, and may transmit the second packet 510 to a third wireless device (e.g., third wireless device 215) using a second beam configuration denoted beam Y. Beam X and beam Y may be different polarizations of the same analog beam (denoted beam Z) on a first antenna panel. The first packet 505 may be addressed to the second wireless device, and the second packet 510 may be addressed to the third wireless device. In some examples, the wireless device may be a base station (e.g., base station 105 described with reference to FIG. 1) and the second and third wireless devices may be UEs (e.g., UEs 115 described with reference to FIG. 1).

The first packet 505 may arrive or otherwise become available for transmission at the wireless device at time t1. The wireless device may select beam X for transmission of the first packet 505 and may begin performing a channel access procedure 515 for beam Z based at least in part on a first state machine and/or timer at time t1. The first state machine and/or timer may be associated with a first antenna panel. The channel access procedure 515 may be an energy detection listen before talk (LBT) procedure, a preamble based LBT procedure, or another LBT procedure. For example, the MU-MIMO base station may select thresholds for energy detection and/or preamble detection to use during the channel access procedure 515. In some examples, the channel access procedure 515 may include energy detection over N contention slots (countdown from N to 0). In some examples, the channel access procedure 515 may include monitoring for a RRQ or a RRS over M slots.

The channel access procedure 515 may be considered successful if the channel is determined available for communicating the downlink data and unsuccessful if the base station detects an energy level/preamble above the threshold and/or other RRQ/RRS exchanges on the channel during the channel access procedure 515. In some examples, the channel access procedure 515 may be considered successful when there are no active RRQ or RRS exchanges detected during the channel access procedure 515.

In some examples, the channel access procedure 515 may be operator-based. For example, the base station may determine that an active RRQ or RRS is received from other devices during the channel access procedure 515 and perform a backoff procedure based on the active RRQ or RRS for the operator of the base station (e.g., the first operator) and/or for a different operator (second operator).

The second packet 510 may become available for transmission at the wireless device at time t2. The base station may select beam Y for transmission of the second packet 510. Because the channel access procedure 515 is already being performed with respect to beam Z (which includes beam Y), the wireless device may rely on the channel access procedure 515 rather than starting a second channel access procedure.

When the channel access procedure 515 is successful, the wireless device may transmit a first RRQ 520 to the second wireless device and a second RRQ 525 to the third wireless device at time t4. The first RRQ 520 may include a reservation request for beam X and may be transmitted on beam X. The second RRQ 525 may include a reservation request for beam Y and may be transmitted on beam Y.

The second wireless device may respond to the first RRQ 520 by transmitting a first RRS 530 using beam X. The wireless device may then communicate with the second wireless device using beam X. The wireless device may transmit first preamble 535, first control 540, and first data 545 to the second wireless device using beam X, as described herein with reference to FIG. 4. The wireless device may also receive first block ACK 550 from the second wireless device using beam X.

The third wireless device may respond to the second RRQ 525 by transmitting a second RRS 555 using beam Y. The base station may then communicate with the third wireless device using beam Y. The base station may transmit second preamble 560, second control 565, and second data 570 to the third wireless device using beam Y, as described herein with reference to FIG. 4. The wireless device may also receive second block ACK 575 from the third wireless device using beam Y.

Figure 6:
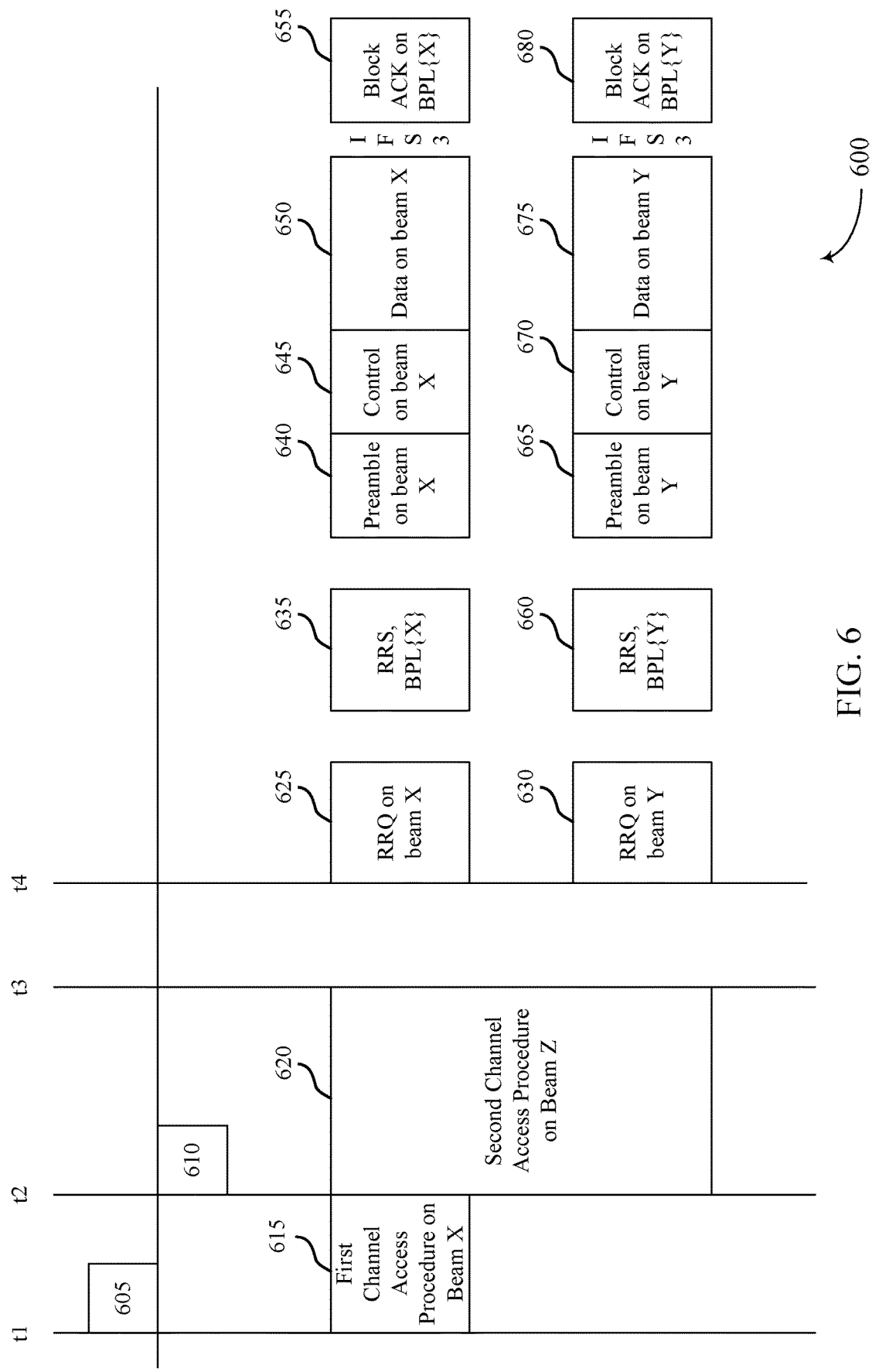
FIG. 6 illustrates an example of a timing diagram for a wireless communication system that supports listen before talk for millimeter wave multi-user multiple-input multiple-output communications in accordance with aspects of the present disclosure.

FIG. 6 illustrates an example of a timing diagram 600 in a wireless communications system that supports listen before talk for millimeter wave multi-user multiple-input multiple-output communications in accordance with various aspects of the present disclosure. In some examples, the wireless communications system may implement aspects of wireless communications system 100.

The timing diagram 600 shows communications involved in the transmission of a first packet 605 and a second packet 610 using different beams at a wireless device such as first wireless device 205 described with reference to FIG. 2. The wireless device may include a MU-MIMO antenna array such as antenna array 300 described with reference to FIG. 3. In some examples, the antenna panels may share state machines and/or timers. In some examples, each state machine and/or timer may be associated with one or more antenna panels such that the total number of state machines and/or timers is less than the total number of antenna panels. In other examples, each state machine and/or timer may be associated with two or more panels.

The wireless device may transmit the first packet 605 to a second wireless device (e.g., second wireless device 210 as described with reference to FIG. 2) using a first beam configuration denoted beam X, and may transmit the second packet 610 to a third wireless device (e.g., third wireless device 215 as described with reference to FIG. 2) using a second beam configuration denoted beam Y. Beam X and beam Y may be on different antenna panels. The first packet 605 may be addressed to the second wireless device, and the second packet 610 may be addressed to the third wireless device. In some examples, the wireless device may be a base station (e.g., base station 105 described with reference to FIG. 1) and the second and third wireless devices may be UEs (e.g., UEs 115 described with reference to FIG. 1).

The first packet 605 may become available for transmission at the wireless device at time t1. The wireless device may select beam X for transmission of the first packet 605 and may begin performing a first channel access procedure 615 for beam X based at least in part on a first state machine and/or timer at time t1. The first state machine and/or timer may be associated with a first antenna panel. The first channel access procedure 615 may be an energy detection LBT procedure, a preamble based LBT procedure, or another LBT procedure. For example, the wireless device may select thresholds for energy detection and/or preamble detection to use during the first channel access procedure 615. In some examples, the first channel access procedure 615 may include energy detection over N contention slots (countdown from N to 0). In some examples, the first channel access procedure 615 may include monitoring for a RRQ or RRS over M slots.

The first channel access procedure 615 may be considered successful if the channel is determined available for communicating the downlink data and unsuccessful if the base station detects an energy level/preamble above the threshold and/or other RRQ/RRS exchanges on the channel during the first channel access procedure 615. In some examples, the first channel access procedure 615 may be considered successful when there are no active RRQ or RRS exchanges detected during the first channel access procedure 615.

In some examples, the first channel access procedure 615 may be operator-based. For example, the wireless device may determine that an active RRQ or RRS is received from other devices during the first channel access procedure 615 and perform a backoff procedure based on the active RRQ or RRS for the operator of the base station (e.g., the first operator) and/or for a different operator (second operator).

The second packet 610 may become available for transmission at the wireless device at time t2. The wireless device may select beam Y for transmission of the second packet 610. Beam Y may be on a second antenna panel different than the first antenna panel that is also associated with the first state machine and/or timer. The wireless device may begin performing a second channel access procedure 620 for beam Z based at least in part on a first state machine and/or timer at time t2. Beam Z may be a wide beam including beam X and beam Y. The wireless device may abandon the first channel access procedure 615.

When the second channel access procedure 620 is successful, the wireless device may transmit a first RRQ 625 to the second wireless device and a second RRQ 630 to the third wireless device at time t3. The first RRQ 625 may include a reservation request for beam X and may be transmitted on beam X. The second RRQ 630 may include a reservation request for beam Y and may be transmitted on beam Y.

The second wireless device may respond to the first RRQ 625 by transmitting a first RRS 635 using beam X. The wireless device may then communicate with the second wireless device using beam X. The wireless device may transmit first preamble 640, first control 645, and first data 650 to the second wireless device using beam X, as described herein with reference to FIG. 4. The wireless device may also receive first block ACK 655 from the second wireless device using beam X.

The third wireless device may respond to the second RRQ 630 by transmitting a second RRS 660 using beam Y. The wireless device may then communicate with the third wireless device using beam Y. The wireless device may transmit second preamble 665, second control 670, and second data 675 to the third wireless device using beam Y, as described herein with reference to FIG. 4. The wireless device may also receive second block ACK 680 from the third wireless device using beam Y.

In some examples, the wireless device may transmit on additional beams within wide beam Z based at least in part on the second channel access procedure 620. For example, when a third packet arrives at the base station between t2 and t3, and the wireless device may select a third beam configuration, denoted beam A, for transmission of the third packet, and the wireless device may transmit a third RRQ on beam A at time t4 if beam Z is associated with the first the first state machine and/or timer and is within beam A.

Figure 7:
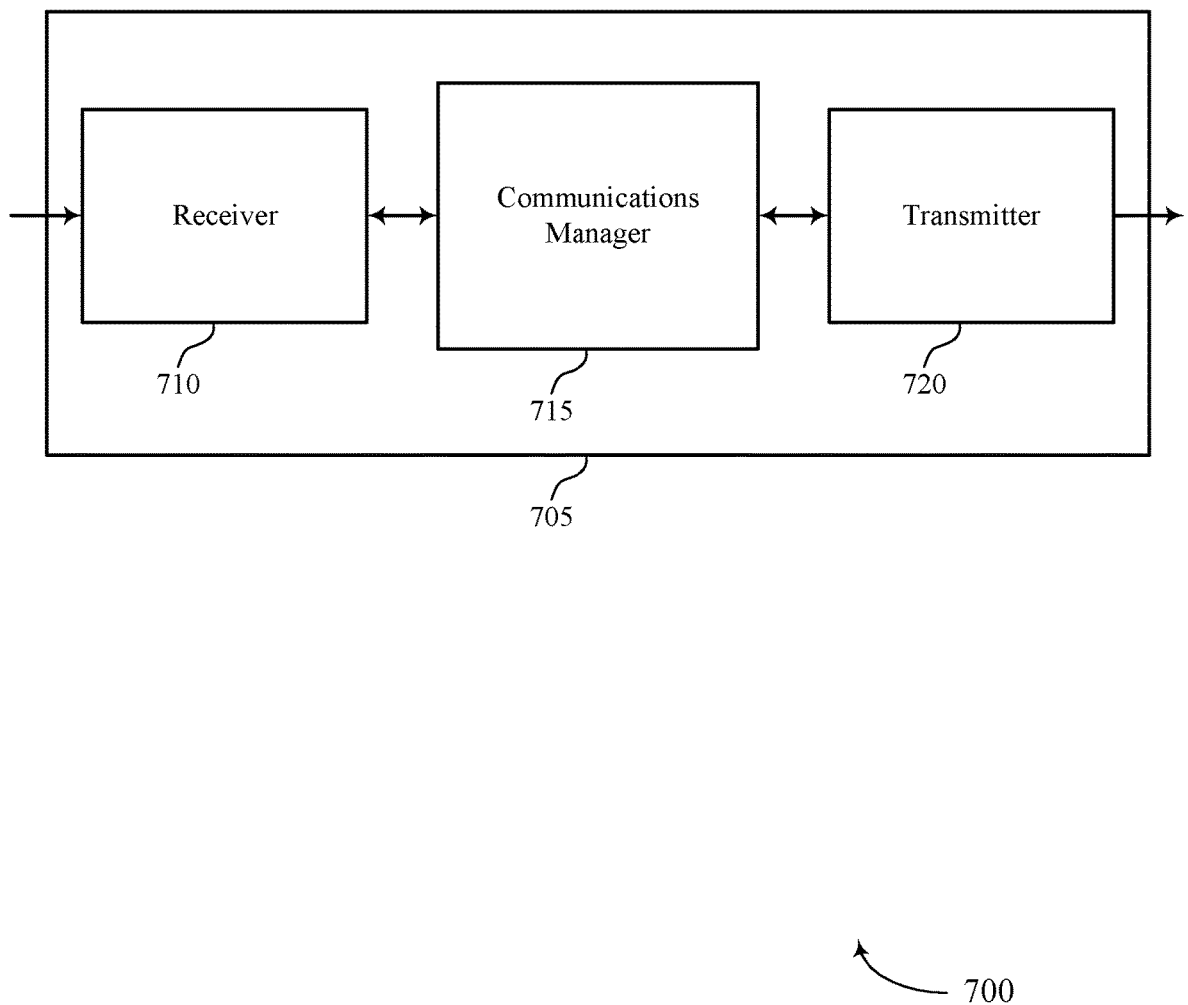
FIGS. 7 through 9 show block diagrams of a device that supports listen before talk for millimeter wave multi-user multiple-input multiple-output communications in accordance with aspects of the present disclosure.

FIG. 7 shows a block diagram 700 of a wireless device 705 that supports listen before talk for millimeter wave multi-user multiple-input multiple-output communications in accordance with aspects of the present disclosure. Wireless device 705 may be an example of aspects of a base station 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to listen before talk for millimeter wave multi-user multiple-input multiple-output communications, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10.

Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may perform a first listen before talk (LBT) procedure for a first beam based on a first LBT timer, perform a second LBT procedure for a second beam based on a second LBT timer, and perform a multiple user multiple-input multiple output (MU-MIMO) transmission based on the first LBT procedure and the second LBT procedure, where the MU-MIMO transmission includes transmitting a first packet addressed to a second wireless device over the first beam and a second packet addressed to a third wireless device over the second beam. The communications manager 715 may also perform a first listen before talk (LBT) procedure for a first beam based on a first LBT timer, the first beam including a second beam and a third beam and perform a multiple user multiple-input multiple output (MU-MIMO) transmission based on the first LBT procedure, where the MU-MIMO transmission includes transmitting a first packet addressed to a second wireless device over the second beam and a second packet addressed to a third wireless device over the third beam.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
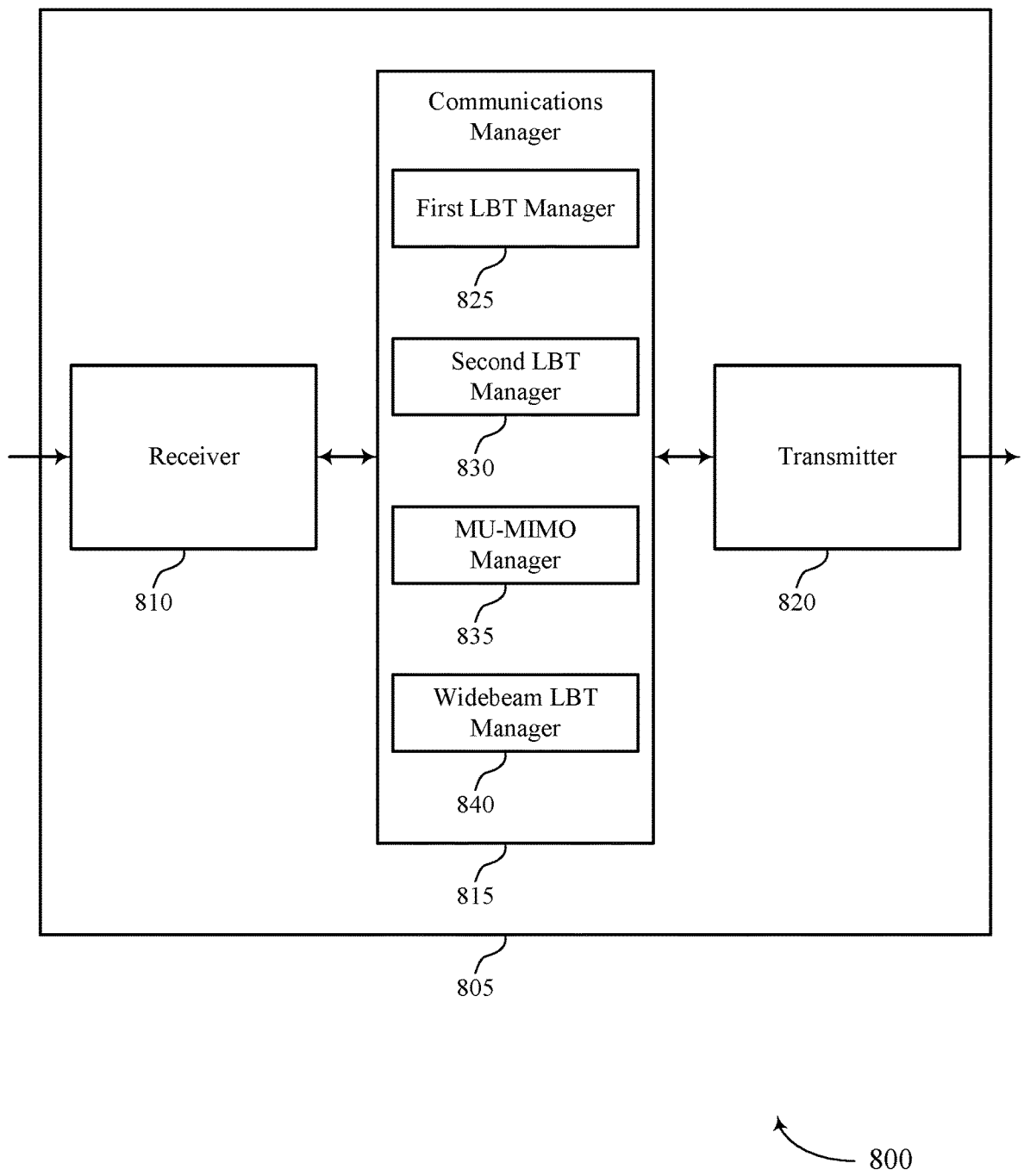

FIG. 8 shows a block diagram 800 of a wireless device 805 that supports listen before talk for millimeter wave multi-user multiple-input multiple-output communications in accordance with aspects of the present disclosure. Wireless device 805 may be an example of aspects of a wireless device 705 or a base station 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to listen before talk for millimeter wave multi-user multiple-input multiple-output communications, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10.

Communications manager 815 may also include first LBT manager 825, second LBT manager 830, MU-MIMO manager 835, and widebeam LBT manager 840.

First LBT manager 825 may perform a first listen before talk (LBT) procedure for a first beam based on a first LBT timer. In some cases, the first timer corresponds to the first antenna panel. In some cases, the first timer corresponds to a first group of one or more antenna panels, the first group including the first antenna panel. In some cases, the first timer corresponds to a first set of antenna panels, the first set of antenna panels including the first antenna panel.

Second LBT manager 830 may perform a second LBT procedure for a second beam based on a second LBT timer, perform the second LBT procedure after performing the first LBT procedure, perform the second LBT procedure includes performing energy detection on a first polarization of the second beam and a second polarization of the second beam at the second antenna panel, perform energy detection on third beam including the second beam and a fourth beam corresponding to a configuration of a third antenna panel, and perform the first LBT procedure in parallel with performing the second LBT procedure. In some cases, performing the second LBT procedure includes: performing energy detection on the second beam. In some cases, the first beam corresponds to a configuration of a first antenna panel of the first wireless device, and the second beam corresponds to a configuration of a second antenna panel of the first wireless device. In some cases, the second timer corresponds to a second group of one or more antenna panels, the second group including the second antenna panel. In some cases, the second timer corresponds to a second set of antenna panels, the second set of antenna panels including the second antenna panel. In some cases, the second beam includes a third beam corresponding to a configuration at a second antenna panel and a fourth beam corresponding to a configuration at a third antenna panel. In some cases, the second timer corresponds to the second antenna panel.

MU-MIMO manager 835 may perform a multiple user multiple-input multiple output (MU-MIMO) transmission based on the first LBT procedure and the second LBT procedure, where the MU-MIMO transmission includes transmitting a first packet addressed to a second wireless device over the first beam and a second packet addressed to a third wireless device over the second beam, transmit a third packet addressed to a fourth wireless device using the second polarization of the second beam in parallel with transmitting the second packet using the first polarization of the second beam, transmit the second packet over the second beam in parallel with transmitting the third packet over the fourth beam, transmit the second packet over the second beam includes transmitting the second packet over the third beam, transmit a third packet addressed to a fourth wireless device over the fourth beam in parallel with transmitting the second packet over the third beam, and perform a multiple user multiple-input multiple output (MU-MIMO) transmission based on the first LBT procedure, where the MU-MIMO transmission includes transmitting a first packet addressed to a second wireless device over the second beam and a second packet addressed to a third wireless device over the third beam. In some cases, the transmission of the first packet over the first beam overlaps with the transmission of the second packet over the second beam. In some cases, the MU-MIMO transmission further includes transmitting a third packet addressed to a fourth wireless device over the third beam.

Widebeam LBT manager 840 may perform a first listen before talk (LBT) procedure for a first beam based on a first LBT timer, the first beam including a second beam and a third beam, abandon the second LBT procedure based on the determining, and perform a second LBT procedure for the second beam based on the first LBT timer prior to performing the first LBT procedure. In some cases, the transmission of the first packet over the second beam overlaps with the transmission of the second packet over the third beam. In some cases, the third beam includes a second polarization of the configuration. In some cases, the second beam includes a first configuration at a first antenna panel. In some cases, the third beam includes a second configuration at a second antenna panel. In some cases, the second beam includes a first polarization of a configuration at a first antenna panel. In some cases, the first wireless device includes a set of LBT timers, where each of the LBT timers corresponds to an antenna panel of the first wireless device. In some cases, the first wireless device includes a set of LBT timers, where each of the LBT timers corresponds to one or more antenna panels of the first wireless device. In some cases, the first wireless device includes a set of LBT timers, where each of the LBT timers corresponds to a set of antenna panels of the first wireless device.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
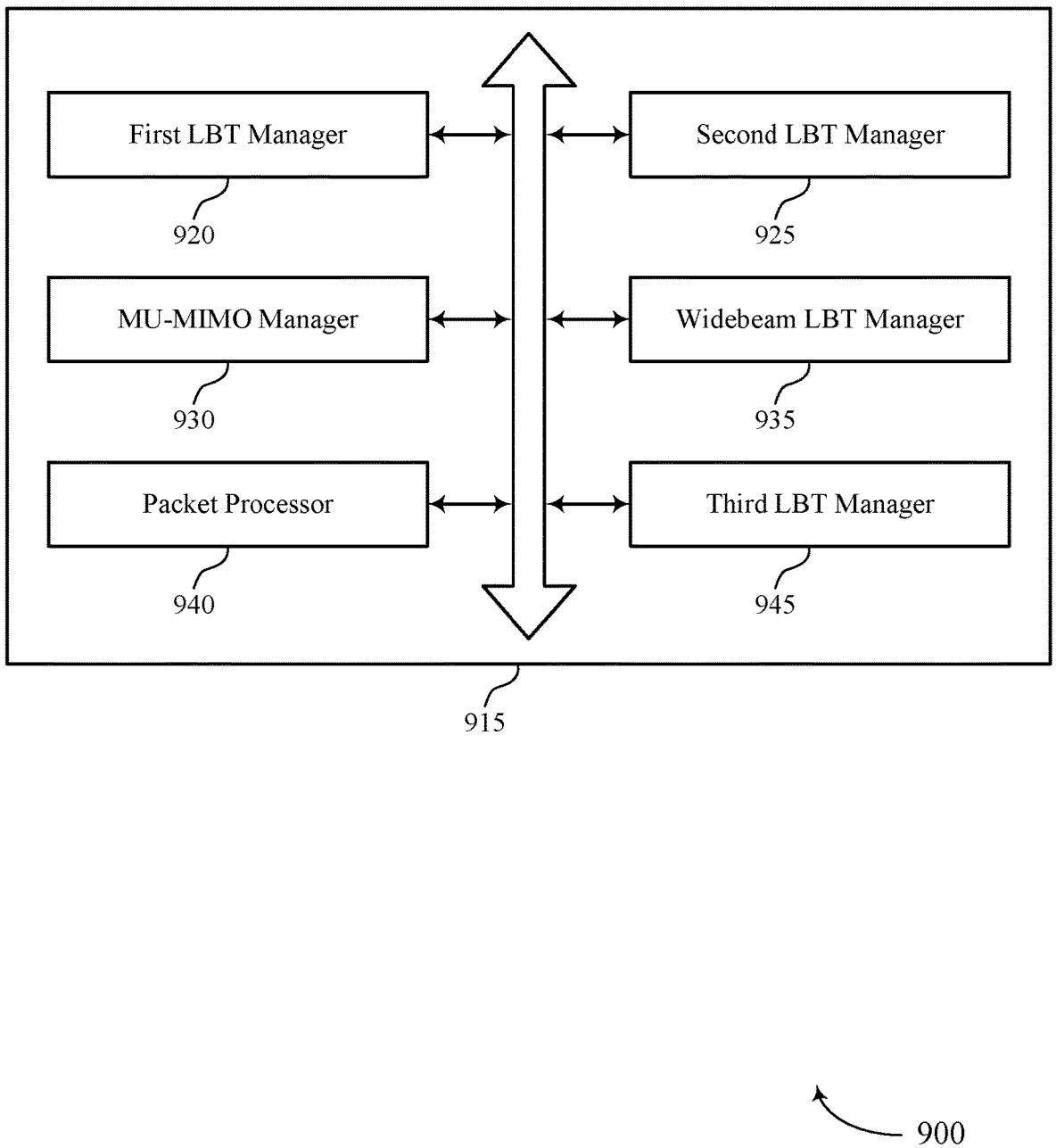

FIG. 9 shows a block diagram 900 of a communications manager 915 that supports listen before talk for millimeter wave multi-user multiple-input multiple-output communications in accordance with aspects of the present disclosure. The communications manager 915 may be an example of aspects of a communications manager 715, a communications manager 815, or a communications manager 1015 described with reference to FIGS. 7, 8, and 10. The communications manager 915 may include first LBT manager 920, second LBT manager 925, MU-MIMO manager 930, widebeam LBT manager 935, packet processor 940, and third LBT manager 945. Each of these modules may communicate, directly or indirectly, with one another (e.g., via one or more buses).

First LBT manager 920 may perform a first listen before talk (LBT) procedure for a first beam based on a first LBT timer. In some cases, the first timer corresponds to the first antenna panel. In some cases, the first timer corresponds to a first group of one or more antenna panels, the first group including the first antenna panel. In some cases, the first timer corresponds to a first set of antenna panels, the first set of antenna panels including the first antenna panel.

Second LBT manager 925 may perform a second LBT procedure for a second beam based on a second LBT timer, perform the second LBT procedure after performing the first LBT procedure, perform the second LBT procedure includes performing energy detection on a first polarization of the second beam and a second polarization of the second beam at the second antenna panel, perform energy detection on third beam including the second beam and a fourth beam corresponding to a configuration of a third antenna panel, and perform the first LBT procedure in parallel with performing the second LBT procedure. In some cases, performing the second LBT procedure includes: performing energy detection on the second beam. In some cases, the first beam corresponds to a configuration of a first antenna panel of the first wireless device, and the second beam corresponds to a configuration of a second antenna panel of the first wireless device. In some cases, the second timer corresponds to a second group of one or more antenna panels, the second group including the second antenna panel. In some cases, the second timer corresponds to a second set of antenna panels, the second set of antenna panels including the second antenna panel. In some cases, the second beam includes a third beam corresponding to a configuration at a second antenna panel and a fourth beam corresponding to a configuration at a third antenna panel. In some cases, the second timer corresponds to the second antenna panel.

MU-MIMO manager 930 may perform a multiple user multiple-input multiple output (MU-MIMO) transmission based on the first LBT procedure and the second LBT procedure, where the MU-MIMO transmission includes transmitting a first packet addressed to a second wireless device over the first beam and a second packet addressed to a third wireless device over the second beam, transmit a third packet addressed to a fourth wireless device using the second polarization of the second beam in parallel with transmitting the second packet using the first polarization of the second beam, transmit the second packet over the second beam in parallel with transmitting the third packet over the fourth beam, transmit the second packet over the second beam includes transmitting the second packet over the third beam, transmit a third packet addressed to a fourth wireless device over the fourth beam in parallel with transmitting the second packet over the third beam, and perform a multiple user multiple-input multiple output (MU-MIMO) transmission based on the first LBT procedure, where the MU-MIMO transmission includes transmitting a first packet addressed to a second wireless device over the second beam and a second packet addressed to a third wireless device over the third beam. In some cases, the transmission of the first packet over the first beam overlaps with the transmission of the second packet over the second beam. In some cases, the MU-MIMO transmission further includes transmitting a third packet addressed to a fourth wireless device over the third beam.

Widebeam LBT manager 935 may perform a first listen before talk (LBT) procedure for a first beam based on a first LBT timer, the first beam including a second beam and a third beam, abandon the second LBT procedure based on the determining, and perform a second LBT procedure for the second beam based on the first LBT timer prior to performing the first LBT procedure. In some cases, the transmission of the first packet over the second beam overlaps with the transmission of the second packet over the third beam. In some cases, the third beam includes a second polarization of the configuration. In some cases, the second beam includes a first configuration at a first antenna panel. In some cases, the third beam includes a second configuration at a second antenna panel. In some cases, the second beam includes a first polarization of a configuration at a first antenna panel. In some cases, the first wireless device includes a set of LBT timers, where each of the LBT timers corresponds to an antenna panel of the first wireless device. In some cases, the first wireless device includes a set of LBT timers, where each of the LBT timers corresponds to one or more antenna panels of the first wireless device. In some cases, the first wireless device includes a set of LBT timers, where each of the LBT timers corresponds to a set of antenna panels of the first wireless device.

Packet processor 940 may receive a third packet addressed to a fourth wireless device and determine to transmit the second packet over the third beam.

Third LBT manager 945 may perform a third LBT procedure for a third beam based on a third LBT timer.

Figure 10:
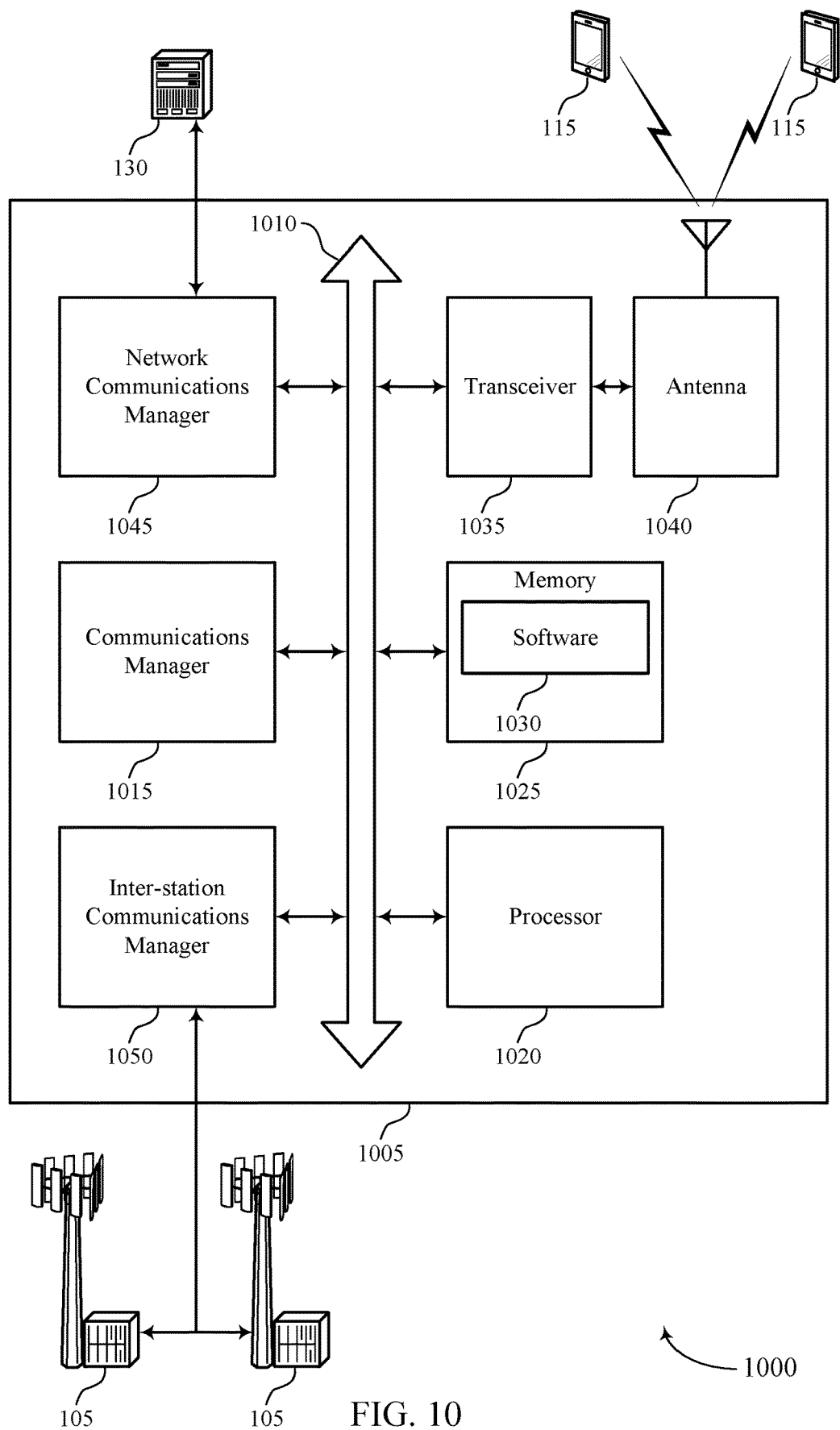
FIG. 10 illustrates a block diagram of a system including a base station that supports listen before talk for millimeter wave multi-user multiple-input multiple-output communications in accordance with aspects of the present disclosure.

FIG. 10 shows a diagram of a system 1000 including a device 1005 that supports listen before talk for millimeter wave multi-user multiple-input multiple-output communications in accordance with aspects of the present disclosure. Device 1005 may be an example of or include the components of wireless device 705, wireless device 805, or a base station 105 as described herein, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more user equipment (UE)s 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting listen before talk for millimeter wave multi-user multiple-input multiple-output communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support listen before talk for millimeter wave multi-user multiple-input multiple-output communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
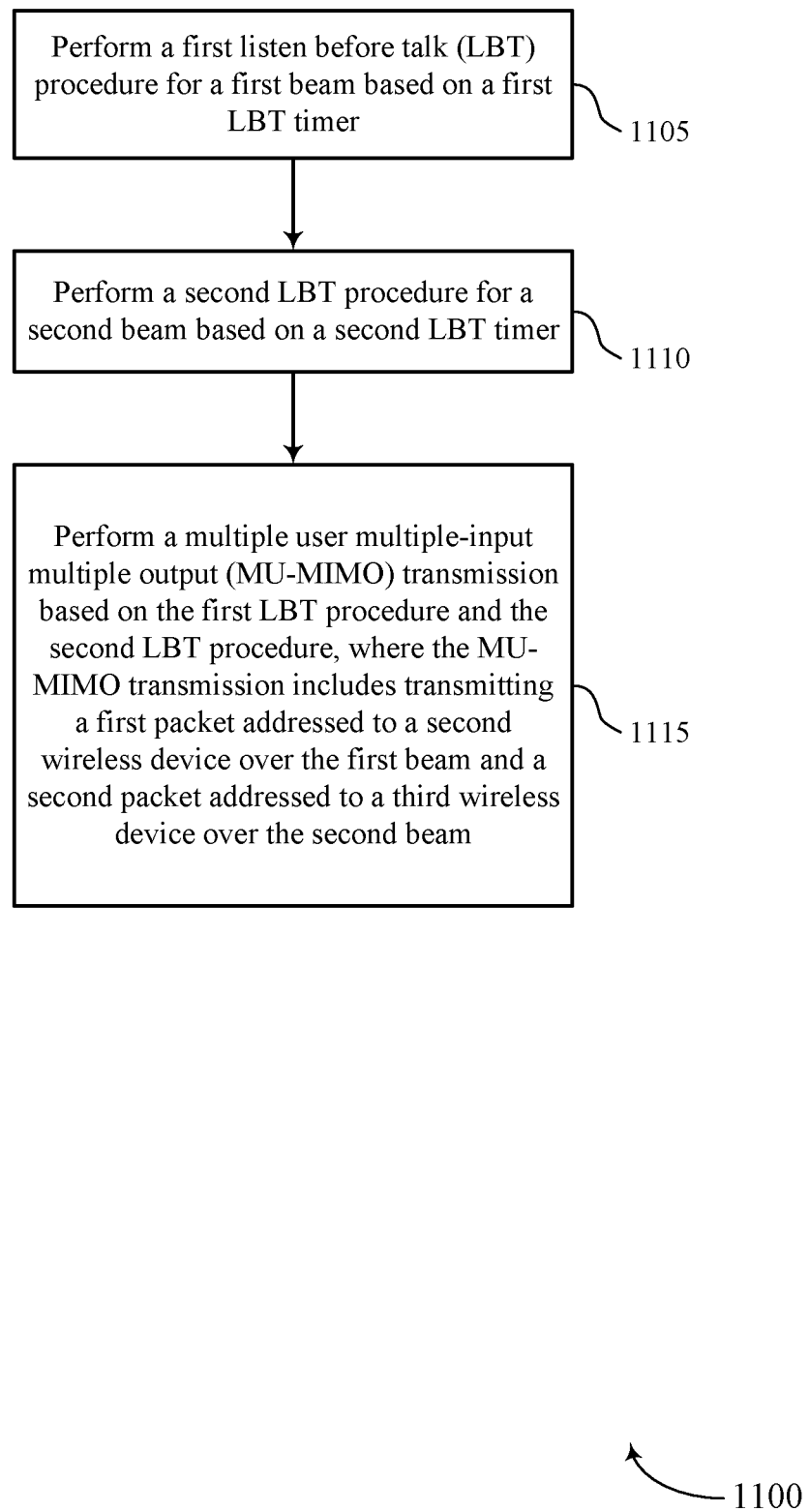
FIGS. 11 through 12 illustrate methods for listen before talk for millimeter wave multi-user multiple-input multiple-output communications in accordance with aspects of the present disclosure.

FIG. 11 shows a flowchart illustrating a method 1100 for listen before talk for millimeter wave multi-user multiple-input multiple-output communications in accordance with aspects of the present disclosure. In some cases, the method 1100 is a method for wireless communication. The operations of method 1100 may be implemented by a base station 105 or its components as described herein. For example, the operations of method 1100 may be performed by a communications manager as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1105 the base station 105 may perform a first listen before talk (LBT) procedure for a first beam based at least in part on a first LBT timer. The operations of 1105 may be performed according to the methods described herein. In certain examples, aspects of the operations of 1105 may be performed by a first LBT manager as described with reference to FIGS. 7 through 10.

At 1110 the base station 105 may perform a second LBT procedure for a second beam based at least in part on a second LBT timer. The operations of 1110 may be performed according to the methods described herein. In certain examples, aspects of the operations of 1110 may be performed by a second LBT manager as described with reference to FIGS. 7 through 10.

At 1115 the base station 105 may perform a multiple user multiple-input multiple output (MU-MIMO) transmission based at least in part on the first LBT procedure and the second LBT procedure, wherein the MU-MIMO transmission comprises transmitting a first packet addressed to a second wireless device over the first beam and a second packet addressed to a third wireless device over the second beam. The operations of 1115 may be performed according to the methods described herein. In certain examples, aspects of the operations of 1115 may be performed by a MU-MIMO manager as described with reference to FIGS. 7 through 10.

Figure 12:
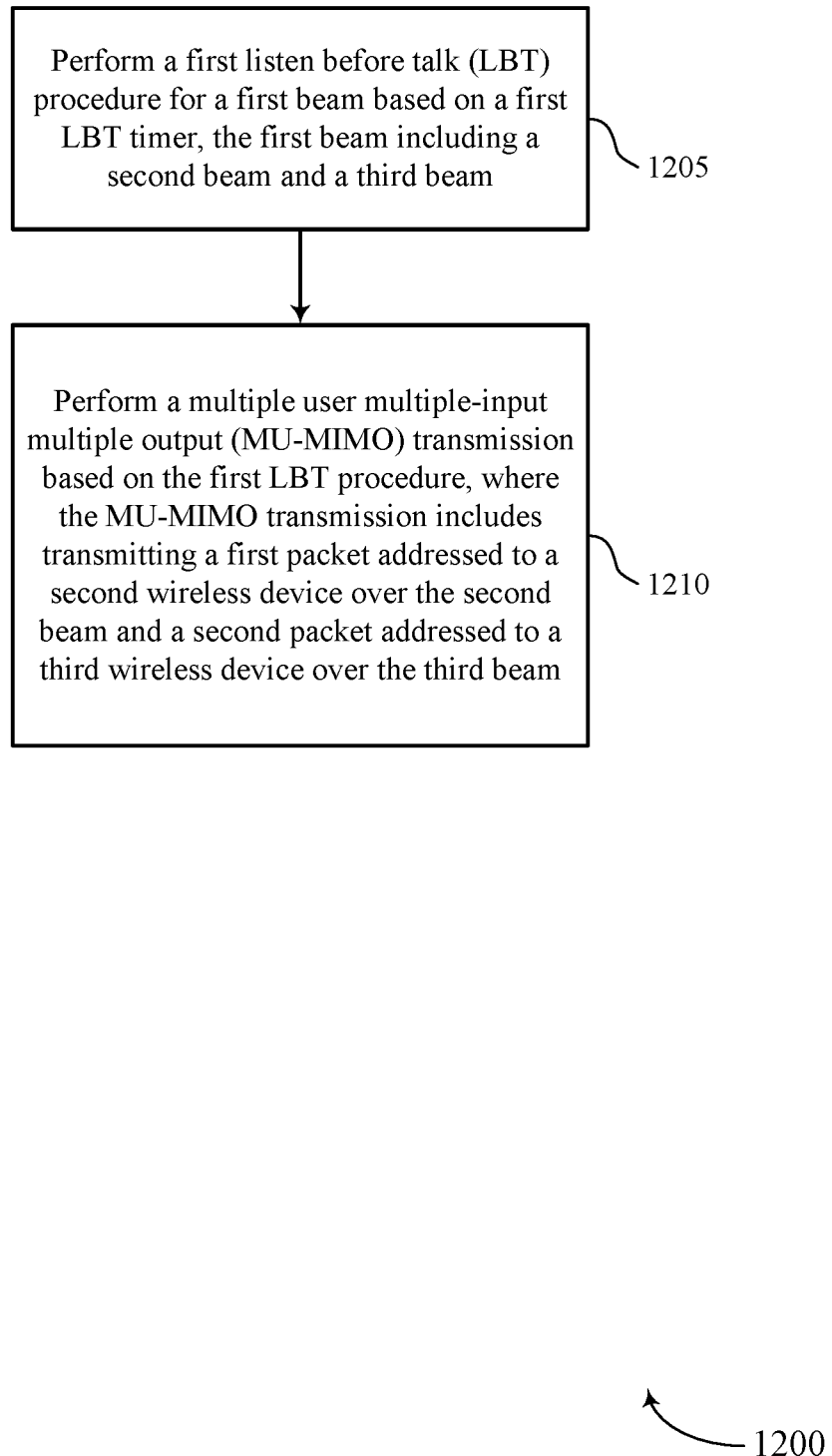

FIG. 12 shows a flowchart illustrating a method 1200 for listen before talk for millimeter wave multi-user multiple-input multiple-output communications in accordance with aspects of the present disclosure. The operations of method 1200 may be implemented by a base station 105 or its components as described herein. For example, the operations of method 1200 may be performed by a communications manager as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1205 the base station 105 may perform a first listen before talk (LBT) procedure for a first beam based at least in part on a first LBT timer, the first beam comprising a second beam and a third beam. The operations of 1205 may be performed according to the methods described herein. In certain examples, aspects of the operations of 1205 may be performed by a widebeam LBT manager as described with reference to FIGS. 7 through 10.

At 1210 the base station 105 may perform a multiple user multiple-input multiple output (MU-MIMO) transmission based at least in part on the first LBT procedure, wherein the MU-MIMO transmission comprises transmitting a first packet addressed to a second wireless device over the second beam and a second packet addressed to a third wireless device over the third beam. The operations of 1210 may be performed according to the methods described herein. In certain examples, aspects of the operations of 1210 may be performed by a MU-MIMO manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying that a first packet is to be transmitted to a second wireless device associated with a first beam;
   identifying that a second packet is to be transmitted to a third wireless device associated with a second beam;
   performing a first listen before talk (LBT) procedure for the first beam using a first LBT timer that is associated with the first beam, wherein the first LBT procedure is performed based at least in part on identifying that the first packet is to be transmitted to the second wireless device;
   performing a second LBT procedure that is different from the first LBT procedure for the second beam using a second LBT timer that is associated with the second beam, wherein the second LBT procedure is performed based at least in part on identifying that the second packet is to be transmitted to the third wireless device; and performing a multiple user multiple-input multiple output (MU-MIMO) transmission based at least in part on the first LBT procedure and the second LBT procedure, wherein the MU-MIMO transmission comprises transmitting the first packet addressed to the second wireless device over the first beam and the second packet addressed to the third wireless device over the second beam.

2. The method of claim 1, wherein the first beam corresponds to a configuration of a first antenna panel of a first wireless device, and the second beam corresponds to a configuration of a second antenna panel of the first wireless device.

3. The method of claim 2, further comprising:
performing the second LBT procedure comprises performing energy detection on a first polarization of the second beam and a second polarization of the second beam at the second antenna panel; and
transmitting a third packet addressed to a fourth wireless device using the second polarization of the second beam in parallel with transmitting the second packet using the first polarization of the second beam.

4. The method of claim 2, wherein performing the second LBT procedure comprises:
performing energy detection on the second beam;
receiving a third packet addressed to a fourth wireless device;
performing energy detection on third beam comprising the second beam and a fourth beam corresponding to a configuration of a third antenna panel; and
transmitting the second packet over the second beam in parallel with transmitting the third packet over the fourth beam.

5. The method of claim 2, wherein:
the first LBT timer corresponds to a first group of one or more antenna panels, the first group comprising the first antenna panel; and
the second LBT timer corresponds to a second group of one or more antenna panels, the second group comprising the second antenna panel.

6. The method of claim 1, wherein:
the second beam comprises a third beam corresponding to a configuration at a second antenna panel and a fourth beam corresponding to a configuration at a third antenna panel; and
transmitting the second packet over the second beam comprises transmitting the second packet over the third beam.

7. The method of claim 6, further comprising:
transmitting a third packet addressed to a fourth wireless device over the fourth beam in parallel with transmitting the second packet over the third beam.

8. The method of claim 1, wherein the transmission of the first packet over the first beam overlaps with the transmission of the second packet over the second beam.

9. The method of claim 1, further comprising:
performing the first LBT procedure in parallel with performing the second LBT procedure.

10. The method of claim 1, further comprising:
performing the second LBT procedure after performing the first LBT procedure.

11. The method of claim 1, further comprising:
performing a third LBT procedure for a third beam based at least in part on a third LBT timer.

12. The method of claim 11, wherein the MU-MIMO transmission further comprises transmitting a third packet addressed to a fourth wireless device over the third beam.

13. A method for wireless communication, comprising:
identifying that a first packet is to be transmitted to a second wireless device associated with a second beam;
identifying that a second packet is to be transmitted to a third wireless device associated with a third beam;
performing, at a first wireless device, a first listen before talk (LBT) procedure for a first beam based at least in part on a first LBT timer that is associated with the first beam, the first beam comprising the second beam and the third beam, the first LBT procedure being performed for the first beam based at least in part on identifying that the first packet is to be transmitted to the second wireless device and that the second packet is to be transmitted to the third wireless device; and
performing, at the first wireless device, a multiple user multiple-input multiple output (MU-MIMO) transmission based at least in part on the first LBT procedure, wherein the MU-MIMO transmission comprises transmitting the first packet addressed to the second wireless device over the second beam and the second packet addressed to the third wireless device over the third beam.

14. The method of claim 13, wherein:
the second beam comprises a first polarization of a configuration at a first antenna panel; and
the third beam comprises a second polarization of the configuration.

15. The method of claim 13, wherein:
the second beam comprises a first configuration at a first antenna panel; and
the third beam comprises a second configuration at a second antenna panel.

16. The method of claim 15, further comprising:
performing a second LBT procedure for the second beam based at least in part on the first LBT timer prior to performing the first LBT procedure;
determining to transmit the second packet over the third beam; and
abandoning the second LBT procedure based at least in part on the determining.

17. The method of claim 13, wherein the first wireless device comprises a plurality of LBT timers, wherein each of the LBT timers corresponds to one or more antenna panels of the first wireless device.

18. The method of claim 13, wherein the transmission of the first packet over the second beam overlaps with the transmission of the second packet over the third beam.

19. An apparatus for wireless communication, comprising:
a processor;
memory in electronic communication with the processor; and
instructions stored in the memory and executable by the processor to cause the apparatus to:
identify that a first packet is to be transmitted to a second wireless device associated with a first beam;
identify that a second packet is to be transmitted to a third wireless device associated with a second beam;
perform a first listen before talk (LBT) procedure for the first beam using a first LBT timer that is associated with the first beam, wherein the first LBT procedure is performed based at least in part on identifying that the first packet is to be transmitted to the second wireless device;

perform a second LBT procedure that is different from the first LBT procedure for the second beam using a second LBT timer that is associated with the second beam, wherein the second LBT procedure is performed based at least in part on identifying that the second packet is to be transmitted to the third wireless device; and perform a multiple user multiple-input multiple output (MU-MIMO) transmission based at least in part on the first LBT procedure and the second LBT procedure, wherein the MU-MIMO transmission comprises transmitting the first packet addressed to the second wireless device over the first beam and the second packet addressed to the third wireless device over the second beam.

20. The apparatus of claim 19, wherein the first beam corresponds to a configuration of a first antenna panel of a first wireless device, and the second beam corresponds to a configuration of a second antenna panel of the first wireless device.

21. The apparatus of claim 20, wherein the instructions are further executable by the processor to cause the apparatus to:
perform the second LBT procedure comprises performing energy detection on a first polarization of the second beam and a second polarization of the second beam at the second antenna panel; and
transmit a third packet addressed to a fourth wireless device using the second polarization of the second beam in parallel with transmitting the second packet using the first polarization of the second beam.

22. The apparatus of claim 20, wherein the instructions to perform the second LBT procedure are executable by the processor to cause the apparatus to:
perform energy detection on the second beam;
receive a third packet addressed to a fourth wireless device;
perform energy detection on third beam comprising the second beam and a fourth beam corresponding to a configuration of a third antenna panel; and
transmit the second packet over the second beam in parallel with transmitting the third packet over the fourth beam.

23. The apparatus of claim 20, wherein:
the first timer corresponds to a first group of one or more antenna panels, the first group comprising the first antenna panel; and
the second timer corresponds to a second group of one or more antenna panels, the second group comprising the second antenna panel.

24. The apparatus of claim 19, wherein:
the second beam comprises a third beam corresponding to a configuration at a second antenna panel and a fourth beam corresponding to a configuration at a third antenna panel; and
transmit the second packet over the second beam comprises transmitting the second packet over the third beam.

25. The apparatus of claim 24, wherein the instructions are further executable by the processor to cause the apparatus to:
transmit a third packet addressed to a fourth wireless device over the fourth beam in parallel with transmitting the second packet over the third beam.

26. An apparatus for wireless communication, comprising:
a processor;
memory in electronic communication with the processor; and
instructions stored in the memory and executable by the processor to cause the apparatus to:
identify that a first packet is to be transmitted to a second wireless device associated with a second beam;
identify that a second packet is to be transmitted to a third wireless device associated with a third beam;
perform, at a first wireless device, a first listen before talk (LBT) procedure for a first beam based at least in part on a first LBT timer that is associated with the first beam, the first beam comprising the second beam and the third beam, the first LBT procedure being performed for the first beam based at least in part on identifying that the first packet is to be transmitted to the second wireless device and that the second packet is to be transmitted to the third wireless device; and
perform, at the first wireless device, a multiple user multiple-input multiple output (MU-MIMO) transmission based at least in part on the first LBT procedure, wherein the MU-MIMO transmission comprises transmitting the first packet addressed to the second wireless device over the second beam and the second packet addressed to the third wireless device over the third beam.

27. The apparatus of claim 26, wherein:
the second beam comprises a first polarization of a configuration at a first antenna panel; and
the third beam comprises a second polarization of the configuration.

28. The apparatus of claim 26, wherein:
the second beam comprises a first configuration at a first antenna panel; and
the third beam comprises a second configuration at a second antenna panel.

29. The apparatus of claim 28, wherein the instructions are further executable by the processor to cause the apparatus to:
perform a second LBT procedure for the second beam based at least in part on the first LBT timer prior to performing the first LBT procedure;
determine to transmit the second packet over the third beam; and
abandon the second LBT procedure based at least in part on the determining.

30. The apparatus of claim 26 further comprising a plurality of LBT timers, wherein each of the LBT timers corresponds to one or more antenna panels.

* * * * *